(12) United States Patent
Liu et al.

(10) Patent No.: US 9,245,043 B2
(45) Date of Patent: Jan. 26, 2016

(54) EMBEDDED MEDIA MARKERS AND SYSTEMS AND METHODS FOR GENERATING AND USING THEM

(75) Inventors: Qiong Liu, Milpitas, CA (US); Chunyuan Liao, Mountain View, CA (US); Lynn Wilcox, Palo Alto, CA (US); Anthony Dunnigan, Palo Alto, CA (US); Bee Liew, Cupertino, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 1111 days.

(21) Appl. No.: 12/646,841

(22) Filed: Dec. 23, 2009

(65) Prior Publication Data

US 2011/0154174 A1 Jun. 23, 2011

(51) Int. Cl.
*G06F 17/30* (2006.01)
*G06K 19/06* (2006.01)

(52) U.S. Cl.
CPC .... *G06F 17/30879* (2013.01); *G06K 19/06103* (2013.01)

(58) Field of Classification Search
CPC ............... G06F 17/211; G06F 17/241; G06F 17/30047; G06F 17/30876; G06F 17/30879; G06T 1/0021; G06T 2201/0051; G06T 1/0028; G06K 19/06103
USPC .................................. 715/205, 208, 230–233
See application file for complete search history.

(56) References Cited

U.S. PATENT DOCUMENTS

| | | | |
|---|---|---|---|
| 5,201,011 A * | 4/1993 | Bloomberg et al. | 382/175 |
| 5,892,507 A * | 4/1999 | Moorby et al. | 715/205 |
| 6,366,294 B1 * | 4/2002 | Cunningham et al. | 345/666 |
| 6,577,746 B1 * | 6/2003 | Evans et al. | 382/100 |
| 6,871,789 B2 * | 3/2005 | Hilton et al. | 235/494 |
| 6,952,485 B1 * | 10/2005 | Davidson et al. | 382/100 |
| 7,024,016 B2 * | 4/2006 | Rhoads et al. | 382/100 |
| 7,028,902 B2 * | 4/2006 | Xu et al. | 235/462.1 |
| 7,764,286 B1 * | 7/2010 | Kumar | 345/426 |
| 2002/0135615 A1 * | 9/2002 | Lang | 345/764 |
| 2004/0220935 A1 * | 11/2004 | McGraw et al. | 707/10 |
| 2005/0213153 A1 * | 9/2005 | Hull et al. | 358/1.18 |
| 2007/0050411 A1 * | 3/2007 | Hull et al. | 707/104.1 |
| 2007/0160345 A1 * | 7/2007 | Sakai et al. | 386/95 |
| 2009/0037821 A1 * | 2/2009 | O'Neal et al. | 715/732 |

OTHER PUBLICATIONS

Bay, H., Ess, A., Tuytelaars, T., Van Gool, L. "SURF: Speeded Up Robust Features", Computer Vision and Image Understanding (CVIU), vol. 110, No. 3, pp. 346-359, Sep. 10, 2008.

(Continued)

*Primary Examiner* — Wilson Tsui
(74) *Attorney, Agent, or Firm* — Sughrue Mion, PLLC

(57) ABSTRACT

Embedded Media Markers (EMM) are optical-filter-like overlaid marks that can be printed on a part of a paper document that signify the existence of media associated with that part of the document. Users take a picture of an EMM-signified document patch using a cell phone camera, and the media associated with the EMM-signified document location is retrieved and displayed on the phone. Unlike bar codes, EMMs are nearly transparent and thus do not interfere with the document contents. Retrieval of media associated with an EMM is based on image local features of the captured EMM-signified document patch. A semi-automatically technique places an EMM at a location in a document, in such a way that the EMM encompasses sufficient identification features with minimal disturbance to the original document.

27 Claims, 19 Drawing Sheets

(56) References Cited

OTHER PUBLICATIONS

Erol, B., Emilio Antunez, and J.J. Hull. Hotpaper: multimedia interaction with paper using mobile phones. Proceedings of Multimedia'08, pp. 399-408, Oct. 26, 2008.

Pixazza, Now a picture is worth more than a thousand words. http://pixazza.com (retrieved Jan. 4, 2010).

Hare, J., P. Lewis, L. Gordon, and G. Hart. MapSnapper: Engineering an Efficient Algorithm for Matching Images of Maps from Mobile Phones. Proceedings of Multimedia Content Access: Algorithms and Systems II (Jan. 30, 2008).

Hecht, B., M. Rohs, J. Schoning, and A. Kruger. Wikeye—Using Magic Lenses to Explore Georeferenced Wikipedia Content. Proceedings of the 3rd International Workshop on Pervasive Mobile Interaction Devices (PERMID 2007), pp.

Henze, N. and S. Boll. Snap and share your photobooks. Proceedings of Multimedia'08, pp. 409-418 (Oct. 26, 2008).

Hull, J.J., B. Erol, J. Graham, Q. Ke, H. Kishi, J. Moraleda, and D.G.V. Olst. Paper-based Augmented Reality. Proceedings of Int. Conf. on Artificial Reality and Telexistence, pp. 205-209. (Jul. 2007).

Liu, Q., H. Yano, D. Kimber, C. Liao, and L. Wilcox. High Accuracy and Language Independent Document Retrieval With a Fast Invariant Transform. Proceedings of ICME'09, (2009).

Liu, X. and D. Doermann, Mobile Retriever: access to digital documents from their physical source. Int. J. Doc. Anal. Recognit., 2008. 11 (1): p. 19-27.

Lowe, D.G., Distinctive Image Features from Scale-Invariant Keypoints. Int. J. Comput. Vision, 2004. 60(2): p. 91-110.

Nakia, T., K. Kise, and M. Iwamura. Use of affine invariants in locally likely arranement hashing for camera-based document image retrieval. Preceedings of 7th Int'l Workshop DAS'06, pp. 541-552. (2006).

Parikh, T.S., P. Javid, S. K., K. Ghosh, and K. Toyama. Mobile phones and paper documents: evaluating a new approach for capturing microfinance data in rural India. Proceedings of CHI'06, pp. 551-560. (Apr. 22, 2006).

Wikipedia, Barcode. http://en.wikipedia.org/wiki/Barcode. (Retrieved Jan. 4, 2010).

Rohs, M. Real-world interaction with camera-phones. Proceedings of UCS. IPSJ Press (2004).

Ke, Y. and Sukthankar, R., PCA-SIFT: A More Distinctive Representation for Local Image Descriptors. Computer Vision and pattern Recognition, 2004.

Wikipedia, Digital paper. http://en.wikipedia.org/wiki/Digital paper (Retrieved Jan. 4, 2010).

Reilly, D., Marked-up Maps: Combining Paper Maps and Electronic Information Resources. Personal and Ubiquitous Computing. Volume 10, Issue 4 (Mar. 2006). pp. 215-226. Year of Publication: 2006. ISSN: 1617-4909.

Costanza, E., Designable Visual Markers. 2009 ACM 978-1-60558-246-Jul. 9, 2004. CHI 2009, Apr. 4-9, 2009, Boston, Massachusetts, USA.

Noda, T., Print-type Steganography Technology. FUJITSU. 57, 3, p. 320-324 (May 2006).

Xerox Alto, from Wikpedia http://en.wikipedia.org/wiki/Xerox Alto (Retrieved Jan. 4, 2010).

Mac OS, from Wikipedia http://en.wikipedia.org/wiki/History of Mac OS (Retrieved Jan. 4, 2010).

Xerox 8010 Information System, from Wikipedia http:en.wikipedia.org/wiki/Xerox Star (Retrieved Jan. 4, 2010).

Augmenting Human Intellect: A Conceptual Framework. Douglas C. Engelbart, Summary Report, Stanford Research Instite, on Contract AF 49 (638)-1024, Oct. 1962, 134 pages (Augment, 133182,). http://www.dougengelbart.org/pubs/augment-3906.html.

Hecht David. L., Printed Embedded Data Graphical User Interfaces. IEEE Mar. 2001, pp. 47-55.

* cited by examiner

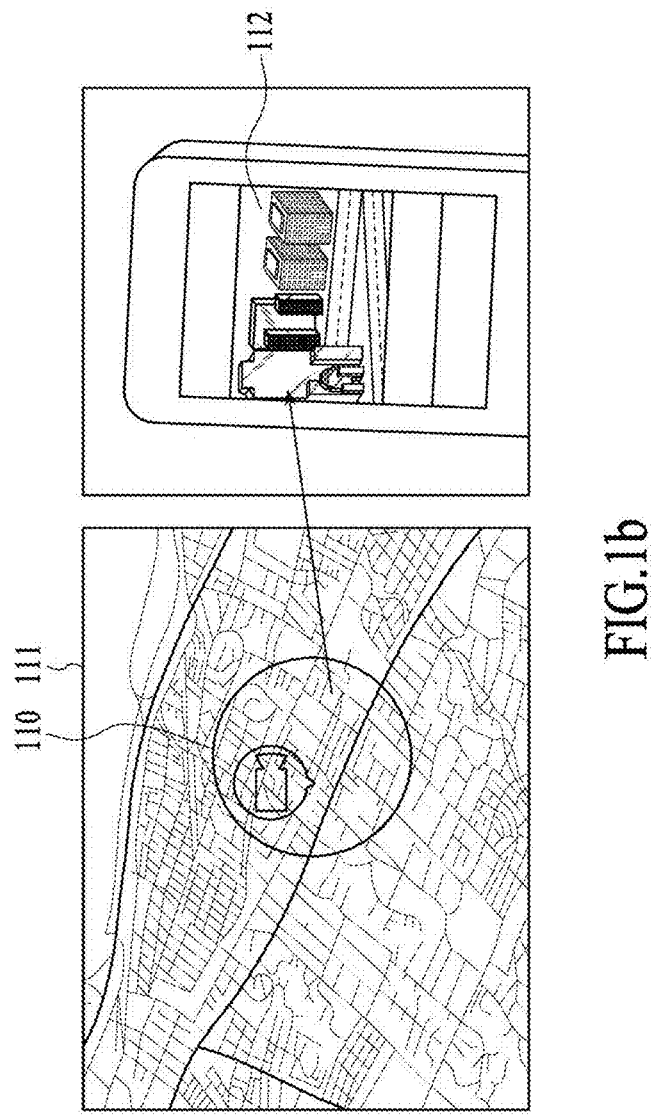

Keypoint distribution (a) and cumulative keypoint distribution (b).

Figure 9. Generate graphical effect for an EMM. (a) A black and white multimedia icon. (b) An EMM decorated with graphical effects.

Figure 12. Approaches for positioning an irregular-shape EMM.
(a) A simple approach. (b) An elaborate approach.

EMBEDDED MEDIA MARKERS AND SYSTEMS AND METHODS FOR GENERATING AND USING THEM

BACKGROUND

1. Field of the Invention

This invention relates in general to embedded media markers, which signify the existence of media associated with a part of a document containing the embedded media marker, and also to methods and systems for generating an article including aforesaid embedded media markers.

2. Description of the Related Art

Although paper is one of the most widely used devices for viewing information, it cannot play dynamic media such as video and audio. On the other hand, cell phones are increasingly used to play audio and video but cannot match paper's high resolution, large display size, flexibility in spatial organization, outdoor-readability and robustness for static content. It is now possible to combine the two, using image recognition technology to link paper documents to corresponding dynamic media. A cell phone camera is used to capture an image of a document patch. The document patch is identified using features in the image, and digital media linked to that location in the document is retrieved and then played on the cell phone.

A common method for creating this type of media link on a paper document is to print coded markers on the document. Examples of such markers include two-dimensional bar codes and printed patterns of dots, described in Hecht, B., M. Rohs, J. Schöning, and A. Krüger, *Wikeye—Using Magic Lenses to Explore Georeferenced Wikipedia Content*, Proceedings of the 3rd International Workshop on Pervasive Mobile Interaction Devices (PERMID), pp 6-10, both of which are well known to persons of skill in the art. However, these markers are visually obtrusive and interfere with the document content layout. DataGlyphs, described in Hecht D. L., *Embedded Data Glyph Technology for Hardcopy Digital Documents*, SPIE—Color Hard Copy and Graphics Arts III, Vol. 2171. February 1994, pp 341-352, overcome these problems by printing a nearly invisible machine-recognizable pattern on the paper. However, this type of marker requires high resolution printers and cameras to identify document locations. Electronic markers such as RFID, described, for example, in Reilly, D., M. Rodgers, R. Argue, et al., *Marked-up maps: combining paper maps and electronic information resources*, Personal and Ubiquitous Computing, 2006, 10(4): pp 215-226, can also be used, but result in substantial increase of production costs.

Other systems use features of the document content itself for identifying the relevant document patch and using it to create a media link. For example, HotPaper, described in Erol, B., Emilio Antunez, and J. J. Hull, *HOTPAPER: multimedia interaction with paper using mobile phones*, Proceedings of Multimedia '08, pp 399-408, and Mobile Retriever, described in Liu, X. and D. Doermann, *Mobile Retriever: access to digital documents from their physical source*, Int. J. Doc. Anal. Recognit., 2008. 11(1): pp 19-27, use features based on document text such as the spatial layout of words. Other systems such Bookmarkr, described in Henze, N. and S. Boll, *Snap and share your photobooks*, Proceedings of Multimedia '08, pp 409-418, and MapSnapper, described in Hare, J., P. Lewis, L. Gordon, and G. Hart, *MapSnapper: Engineering an Efficient Algorithm for Matching Images of Maps from Mobile Phones*, Proceedings of the SPIE, Volume 6820, pp 68200L-68200L-11 (2008), use pixel level image features, such as the SIFT algorithm, described in Lowe, D. G., *Distinctive Image Features from Scale-Invariant Keypoints*, Int. J. Comput. Vision, 2004, 60(2): pp 91-110, to recognize generic document content such as pictures and graphic elements. With these systems, visually obtrusive marks are not required for identification.

However, both the conventional marker-based methods and content-based methods lack media type indicators. Although bar codes and Data Glyphs are visible, they do not directly indicate the existence or type of media associated with them. When content-based feature are used, there is no on-paper indication to the user that there is media linked to the document. As a result, a user of the aforesaid HotPaper has to pan a camera phone over the paper document to look for hotspots until a feedback such as a red dot or vibration is presented on the cell phone.

Many systems, including HotPaper, Bookmarkr, Mobile Retriever, CAM, described in Parikh, T. S., P. Javid, S. K., K. Ghosh, and K. Toyama, *Mobile phones and paper documents: evaluating a new approach for capturing microfinance data in rural India*, Proceedings of CHI'06, pp. 551-560, have been proposed for using a camera phone to capture and recognize images of paper documents, and then access the linked digital media. For example, Rohs proposed a system, described in Rohs, M., *Real-world interaction with camera-phones*, Proceedings of UCS. IPSJ Press (2004), for augmenting real time images of a paper map with dynamic weather information for specific geographical areas. The aforesaid HotPaper enables users, with a camera phone as a Magic Lens, to add and play multimedia annotations linked to text patches in paper documents. The aforesaid Bookmarkr facilitates retrieval and sharing of digital photos with snapshots of printed photos.

Marker-based systems like the one proposed by Rohs as well as CAM depend on 2D barcodes to identify and manipulate the document contents. On the other hand, WikEye, described in Hecht, B., M. Rohs, J. Schöning, and A. Krüger, *Wikeye—Using Magic Lenses to Explore Georeferenced Wikipedia Content*, Proceedings of the 3rd International Workshop on Pervasive Mobile Interaction Devices (PERMID), pp. 6-10, adopts black dots arranged in a grid as markers. Although easy to detect, the barcodes and dots are often visually obtrusive, require changing the format of original documents, and occupy extra display space on paper. Recent Designable Marker, described in Reilly, D., M. Rodgers, R. Argue, et al., *Marked-up maps: combining paper maps and electronic information resources*, Personal and Ubiquitous Computing, 2006. 10(4): p. 215-226, improves 2D barcodes by incorporating human-readable components into the mark design, but does not address the issues of document-altering and wasted paper space. To overcome these problems, Data Glyphs and Anoto patterns, well known to persons of skill in the art, were proposed. However, these encoding patterns have to be printed by high resolution printers and captured by specialized cameras for decoding. Moreover, Fujitsu proposed a steganographic printing technique that embeds invisible bar codes into printed color images. All of these visible/invisible barcodes, Data Glyphs and Anoto patterns do not reveal to the human meaningful information about the available media.

To avoid some limitations of marker-based systems, PBAR, described in Hull, J. J., B. Erol, J. Graham, Q. Ke, H. Kishi, J. Moraleda, and D. G. V. Olst, *Paper-based Augmented Reality*, Proceedings of Int. Conf. on Artificial Reality and Telexistence, pp. 205-209, HotPaper, Mobile Retriever and LLAH, described in Nakia, T., K. Kise, and M. Iwamura, *Use of affine invariants in locally likely arrangement hashing for camera-based document image retrieval*, Proceedings of 7th Int'l Workshop DAS'06, pp. 541-552, use text features, e.g. the spatial layout of words in a text chunk, to identify document patch images. Bookmarkr, MapSnapper, and FIT, described in Liu, Q., H. Yano, D. Kimber, C. Liao, and L. Wilcox, *High Accuracy and Language Independent Document Retrieval With A Fast Invariant Transform*, Proceedings of ICME'09, pp 386-389, adopt pixel level image features to recognize generic contents including text, pictures and graphic elements. With these systems, visually obtrusive barcodes are not required for identification, the original document formats are intact, and document publishers do not need extra space for barcode printing. On the other hand, since these systems completely remove visible markers on document pages, there is no indication to the user that multimedia information is available at certain locations in the document. Moreover, none of these approaches have marks that can guide users' captures for document patch identification.

Accordingly, new non-obstructive embedded media markers, which can be generated using not only high resolution printing devices but also low-resolution printing devices and methods for implementing and using those markers are needed.

SUMMARY

Various embodiments of the inventive methodology are directed to methods and systems that substantially obviate one or more of the above and other problems associated with conventional techniques related to embedded media markers.

In accordance with one aspect of the present invention, there is provided a computer-implemented method for providing a digital medium by making use of a database and an article, the database storing each set of information, corresponding to each portion of content visualized in a predetermined space, the set of information including a plurality of features within the portion and an embedded digital medium corresponding to the portion, wherein the content portion has an area which includes the plurality of features sufficient to identify each of the content portions, the article holding the content and at least one of an embedded media marker on the content, the embedded media marker including a visible feature boundary located according to the portion of the content. This method may include receiving, from a requestor, an image of a patch including an image of the embedded media marker on the article, extracting a plurality of features within the image of the patch; identifying the embedded digital media corresponding to the embedded media marker by comparing the extracted plurality of features to the plurality of features of the set of information; retrieving the embedded digital media; and providing the retrieved digital media to the requestor.

Additional aspects of the present invention include an article that includes a content visualized on a surface of the article; and an embedded media marker overlaying the visualized content, the embedded media marker comprising a visible feature boundary enclosing a plurality of features of the visualized content, wherein a set of information including the plurality of feature within the feature boundary or at least a part of the content in the feature boundary, and an embedded digital media corresponding to the embedded media marker are stored in a database.

Additional aspects of the present invention include a computer-implemented method for producing an article including a visualized content and an embedded media marker on the content. The method may include receiving a selection of a location on the visualized content of the article; determining a position and a size of the embedded media marker based on a quantity of a plurality of features of the visualized content around the selected location within the embedded media marker; and positioning the embedded media marker on the article based on the determined position and size.

Additional aspects of the present invention may include a computer readable storage medium storing instructions for providing a digital medium by making use of a database and an article, the database storing each set of information, corresponding to each portion of content visualized in a predetermined space, the set of information including a plurality of features within the portion and an embedded digital medium corresponding to the portion, wherein the content portion has an area which includes the plurality of features sufficient to identify each of the content portions, the article holding the content and at least one of an embedded media marker on the content, the embedded media marker including a visible feature boundary located according to the portion of the content. Such instructions may include receiving, from a requestor, an image of a patch including an image of the embedded media marker on the article, extracting a plurality of features within the image of the patch; identifying the embedded digital media corresponding to the embedded media marker by comparing the extracted plurality of feature to the plurality of the feature of the set of information; retrieving the embedded digital media; and providing the retrieved digital media to the requestor.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify embodiments of the present invention and, together with the description, serve to explain and illustrate principles of the inventive technique. Specifically:

FIG. 1(*b*) illustrates one exemplary embodiment of an EMM, which is added to a paper map.

DETAILED DESCRIPTION

Figure 1A:
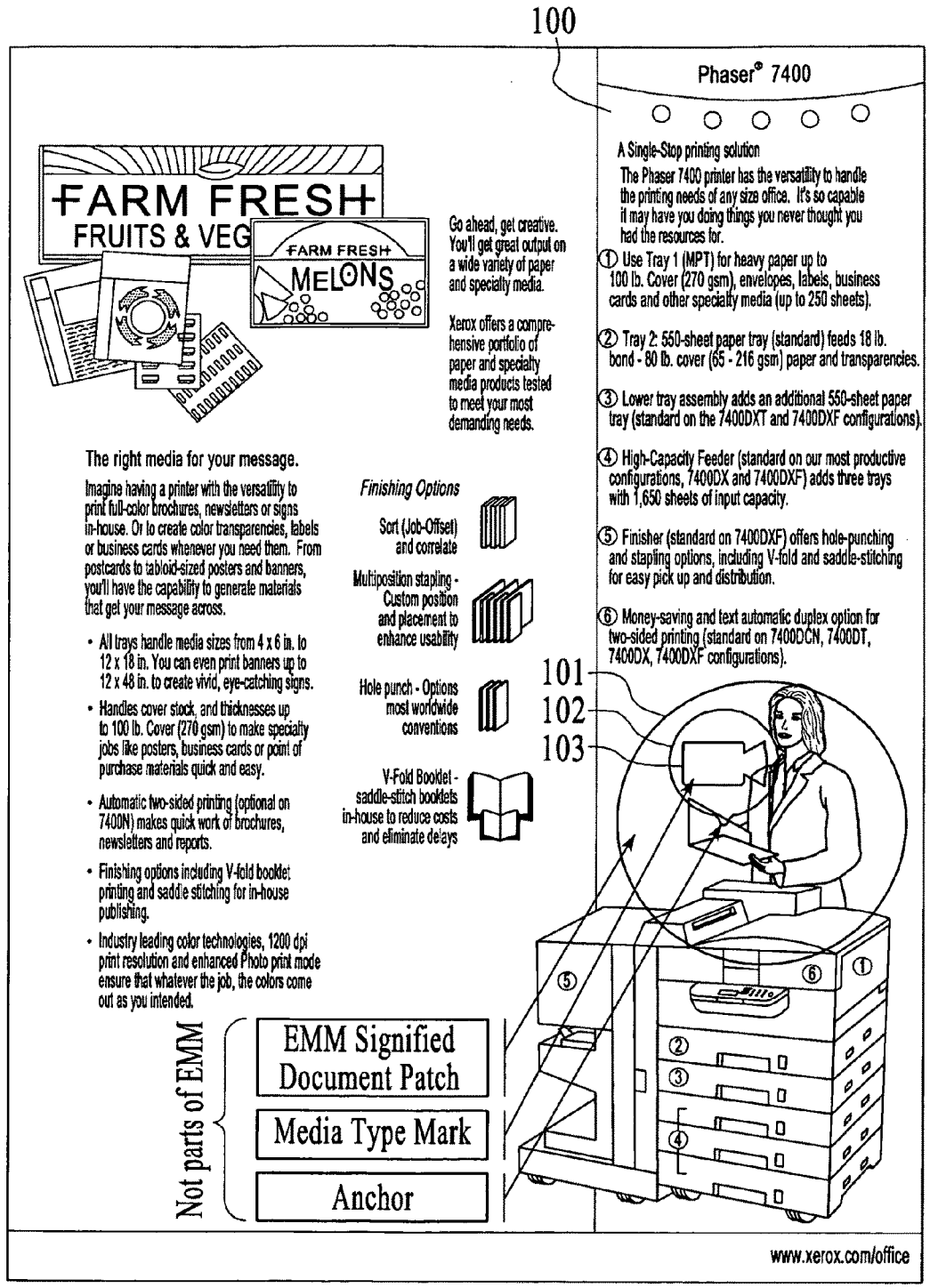
FIG. 1(*a*) illustrates one exemplary embodiment of the Embedded Media Marker (EMM), which is added to a printer description brochure.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

Embodiments of inventive Embedded Media Markers (EMM) are certain types of optical-filter-like overlaid marks printed on paper documents that signify the existence of media associated with a specific part of the document. In accordance with an embodiment of the invention, users take a picture of an EMM-signified document patch using a camera embedded cell phone for example, and the media associated with the EMM-signified document location is displayed on the phone. Unlike bar codes, the embodiments of the inventive EMMs are nearly transparent yet visually recognizable. Thus, the inventive EMMs do not interfere with users' viewing of the document contents. Retrieval of media associated with an EMM is based on local image features of the captured EMM-signified document patch. Some embodiments also describe a technique for semi-automatically placing an EMM at a location in a document, in such a way that it encompasses sufficient identification features with minimal disturbance to the original document.

Aspects of certain embodiments of the present invention provide systems and methods for generating EMMs and describe various objects embodying such markers. In an embodiment of the invention, the EMMs are used to indicate to the user existence of additional digital media or data (digital media object), which can be stored elsewhere, associated with the object (e.g. paper) that embodies the EMM. In addition, using the EMM, the user can easily retrieve and view the associated digital media object. In an embodiment of the invention, such media or data may further explain the content illustrated by the object, which uses the EMM. In other words, the embedded EMM operates like a media link to a local or an external media object related to the object embodying the EMM.

In one or more embodiments of the invention, paper is augmented with meaningful awareness-marks, called Embedded Media Markers (EMMs) that indicate the existence and type of aforesaid media links. In one or more embodiments of the invention, on seeing an EMM, the user is instructed (or otherwise knows) to capture an image of the EMM-signified document patch with a cell phone camera in order to view digital media associated with the document. This is somewhat analogous to Web pages that use underlines, font differences, or image tags to indicate the existence of links that users then click for additional information. In one or more embodiments of the invention, unlike barcodes, EMMs can be nearly transparent and thus do not interfere with the document content. In one or more embodiments of the invention, unlike Embedded Data Glyphs, described in *Embedded Data Glyph Technology for Hardcopy Digital Documents*, SPIE—Color Hard Copy and Graphics Arts III, Vol. 2171. February 1994, pp 341-352 or Anoto patterns, which are known, EMMs can be printed even with a regular low-resolution printer and identified from an image captured by a typical cell phone camera. Furthermore, in one or more embodiments of the invention, the design of EMMs indicates the type of media (e.g. audio, video, image) associated with the EMM-signified document location.

Certain embodiments of the present invention provide a procedure and algorithm for semi-automatically arranging visible EMMs on a paper document. The procedure and algorithm are mainly for paper enhancement systems that use natural content features (no bar codes) on paper to recognize document patches. More specifically, the inventive procedure and algorithm can be used as the base of an authoring tool, with which a media editor can select an anchor point on a page of paper for adding multimedia information and the algorithm can automatically arrange EMMs based on the editor-selected anchor point. The EMM is arranged so that it covers a sufficient quantity of features of the document to identify the location of the patch. The EMMs can then be overlaid on the other document contents for printout of enhanced paper. The EMMs also can be overlaid by placing a transparent EMM printed medium, such as a transparent sheet or sticker, over the corresponding part of the document contents. A user can then obtain extra multimedia information on an active device, such as screens, speakers or other output devices, by capturing an EMM-signified document patch on paper.

FIG. 1(*a*) illustrates an exemplary embodiment of an EMM, which is added to a printer description brochure 100. The illustrated embodiment of the EMM signifies that there is a video corresponding to the magazine in the person's hand. The portion of the document inside the large EMM boundary 101 (a circle in this embodiment) is referred to as an EMM-signified document patch. Within the EMM-signified document patch there is a media type mark, shown here as a smaller boundary 102 (a circle in this embodiment) containing a graphic 103 that indicates the type of media associated with this EMM, in this case video. The arrow connected to the smaller circle 102 points to the exact location in the document 100 that is associated with the media, and is called the anchor, or the EMM-signified document location. Some callouts are shown at the bottom-left corner of FIG. 1(*a*) to explain different components of an EMM. These callouts are not parts of an EMM.

FIG. 1(*b*) illustrates an exemplary embodiment of an EMM 110, which is added to a paper map 111. A paper map 111 offers a large high-quality display of geographic information. It is easily read outdoors, foldable, and easy to share with other people. However, it lacks dynamic location-specific information, such as a video clip about a restaurant, weather forecast for a park, and currently available discounts for a hotel.

With EMMs, such dynamic multimedia can be easily brought to paper maps. As illustrated in FIG. 1(b), on a map of Tokyo, Japan, a Japanese restaurant is augmented by an EMM 110, which points to a video clip about the history and highlights of the place, which can be viewed using a mobile device 112. The mobile device may utilize features or keypoints from the document that fall within the EMM to ascertain which video clip needs to be executed. Similarly, the EMM may point to a customer review site or detailed menus for the restaurant, and allow the user to make a reservation right away. It should be noted that the EMM does not change the original map layout and has minimal appearance interference, which differentiates EMMs from the existing barcode-based techniques. Besides, overlaying an in-place EMM right on top of a POI (point of interest) is especially useful to retain the context of the POI in the map.

Figure 2:
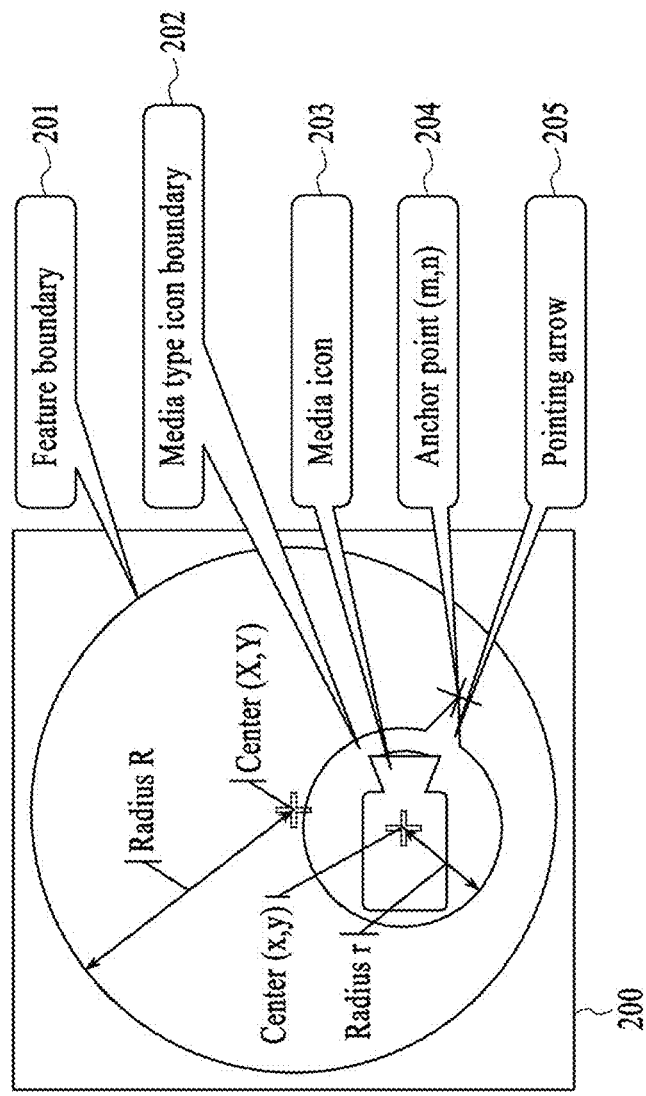
FIG. 2 illustrates an exemplary embodiment of the inventive EMM in greater detail.

FIG. 2 illustrates an exemplary embodiment of the inventive EMM 200 in greater detail, highlighting the feature boundary 201, media type icon boundary 202, media Icon 203, anchor point 204, and pointing arrow 205. The functional design for EMMs 200 and a procedure and algorithm for semi-automatically arranging (EMMs) on paper will be described. More specifically, what is described here is an embodiment of an authoring tool for a user to select an anchor point 204 at a location of a document and associate multimedia information with that location. In accordance with another aspect of certain embodiments of the invention, an algorithm will also be described that automatically finds the best location and arrangement of the EMM for the user-selected anchor point, in such a way that the EMM-signified document patch includes sufficient features to permit accurate recognition. The embedded inventive EMMs are then overlaid (for example, alpha-blended) with the document for printout of the enhanced paper. For adding the EMMs to existing paper documents, the EMMs may also be created on a transparent medium, such as a transparent sheet or stickers, and then overlaid onto the corresponding part of the existing documents. A user can subsequently view media on a cell phone linked to a paper document by capturing an image of the EMM-signified document patch.

Technical Details

In accordance with one or more embodiments of the invention, EMMs are marks on paper that signify the existence of digital media associated with a specific portion of the content printed on the paper. For usability purposes, in accordance with one or more embodiments of the invention, EMMs may have some or all of the following properties:

1. EMMs are visible to humans. An EMM should be a visible mark that signifies the existence of multimedia information associated with the document 2. EMMs are meaningful to humans. An EMM may indicate the type of media, e.g. audio, video, text, image, and annotation, that is associated with the EMM.

3. EMMs may not take up extra space on the paper, nor would the document layout be changed to accommodate the EMMs.

4. EMMs may minimize the semantic change to original paper content. The design and implementation of the EMM may blend with the original document content.

5. EMMs may not significantly degrade the document patch. Since identification is mainly based on document content features, document contents would be well preserved.

6. EMMs may guide users to capture quality images for multimedia retrieval.

7. EMMs may indicate regions with sufficient features for multimedia retrieval.

8. EMMs may limit the document patches that need to be indexed in a database and thus reduce computation complexity and data storage space and improve retrieval accuracy.

Exemplary EMM Construction a. Feature Boundary Mark

Without being able to read and decode a barcode, users have to use other image features to identify relevant paper patches. Such features may be any features extracted from the image on the article or may be a combination of different kinds of features. These features may also be generic image local features extracted from the local spatial arrangement of the image on the article. Among the generic image features, the scale-invariant image local feature such as those described in SIFT, PCA-SIFT, described in Ke, Y. and Sukthankar, R., *PCA-SIFT: A More Distinctive Representation for Local Image Descriptors*, Computer Vision and Pattern Recognition, 2004, SURF, described in Bay, H., Ess, A., Tuytelaars, T., Van Cool, L., *SURF: Speeded Up Robust Features*, Computer Vision and Image Understanding (CVIU), Vol. 110, No. 3, pp 346-359, 2008, and the aforesaid FIT, can work well. They may also be image features based on word center relations in a text patch, as described in Erol, B., Emilio Antunez, and J. J. Hull, *HOTPAPER: multimedia interaction with paper using mobile phones*, Proceedings of Multimedia'08, pp. 399-408, or stroke-center arrangements in a patch, as described in Nakia, T., K. Kise, and M. Iwamura, *Use of affine invariants in locally likely arrangement hashing for camera-based document image retrieval*, Proceedings of 7th Int'l Workshop DAS'06, pp 541-552. Since these features are parts of document images, they do not have a clear boundary as does a barcode. If features at multiple positions are desired to increase identification accuracy, these techniques also do not have a clear boundary for these group features. Without a clear feature boundary, users of a paper document enhancement system may capture a document patch without a sufficient quantity of features for a system to identify the patch. To solve this problem, it is desirable to guide the user's capture with an artificial boundary. More specifically, in certain embodiments of the invention, this boundary is used to set and to include the minimum capture region for patch identification. With the help of this capture region guidance, these embodiments of the invention dramatically reduce indexed features in the feature database. This inventive feature reduction can be very helpful for improving identification accuracy and identification speed.

In accordance with one or more embodiments of the invention, to guarantee sufficient features in different capturing orientation (it is assumed that the camera optical axis is nearly perpendicular to the paper), a feature boundary circle 201, illustrated in FIG. 2, is tentatively used as an artificial feature boundary. The feature boundary circle defines an area or patch on a page encompassing features that can be used to identify the patch. From a paper patch identification aspect, the larger the circle is, the more features can be used to facilitate the paper patch identification. On the other hand, the larger the circle is, the less EMMs can be placed in every page; the larger the circle is, the less benefit one can get from feature reduction. Moreover, a large circle beyond a certain size cannot be fully used by camera phones because of field-of-view and resolution limitations.

In accordance with one or more embodiments of the invention, besides circle size (i.e. radius R in FIG. 2) consideration, the circle position (i.e. center point 107 (X,Y) in FIG. 2) is also important for patch identification. If a circle is positioned at a place with dense feature distribution, the circle radius R can be greatly reduced while the identification accuracy is not compromised. On the other hand, a large circle placed at a blank location may lead to degraded recognition accuracy. These procedures and algorithms provide an inventive method for finding an optimal circle center (X,Y) and radius R.

b. Media Type Mark

In accordance with one or more embodiments of the invention, besides camera phone capture guidance, the media type (e.g. audio, video, weblink) information is also useful for readers of enhanced paper document. The exemplary EMM illustrated in FIG. 2 incorporates a video icon 203 to indicate that a video link is associated with this EMM. The iconic information for media type is surrounded by another circle 202, referred to as a media type icon boundary. This circle 202 is useful for emphasizing the iconic information 203. On the other hand, it is also visually consistent with the feature boundary mark 201.

In accordance with one or more embodiments of the invention, a media icon 203 is generated to be of a certain size to attract user's attention. From another point of view, this mark 203 should not reduce the number of suitable features for document patch identification. An algorithm in accordance with an aspect of the inventive methodology provides a method for finding an optimal center point 206 (x,y) for the iconic mark.

c. Anchor Point and Pointing Arrow

In accordance with one or more embodiments of the invention, because a relatively small circle 202 in FIG. 2 does not have an obvious point to link itself to a specific position on a paper, the resolution of using a circle surrounded iconic mark on a paper is low. Sometimes, this low resolution may make it difficult to convey accurate information to a user. For example, if there are several machine parts close to each other in a figure and there are 3D models for many parts, it will be difficult for people to associate circle surrounded iconic marks with their corresponding parts. To solve this problem, a document creator is prompted by an embodiment of the inventive system to select a specific location as an anchor point (m,n) and add an arrow that points to the anchor point from a circle surrounded icon. This arrow and the circle surrounded icon then form a callout for the specific location (m,n).

d. Graphical Effects

In accordance with one or more embodiments of the invention, to reduce the impact to an original document, skeletons are selected instead of colored regions to represent media type icons. Because humans are generally good at separating alpha-blended images, alpha-blending media-type-icons with the original document can further reduce semantic impacts to original document. By changing the alpha-blending coefficients for different color channels and regions, an embodiment of the inventive concept may also alter the text color or picture color in an EMM-signified region. Moreover, because graphical objects in a paper document are mainly in 2D space, an embodiment of the inventive methodology adds a 3D graphical effect to EMMs, which further facilitates the separation of EMMs and other graphical objects in the original document.

In accordance with one or more embodiments of the invention, as shown in FIG. 2, one or more inventive EMMs may have a similar appearance: a large circle 201 surrounding a smaller circle 202. The smaller circle 202 features a simple icon 203 and an attached arrow 205 (see FIG. 2). This homogeneity in appearance of some embodiments is designed to allow users to find the EMMs on a page very quickly. The function of an EMM is similar to the simple colored and underlined hyperlink on a traditional web page. Unlike a hyperlink, embodiments of EMM are printed on physical paper and use a meaningful icon (203) to indicate available media associated with the EMM-signified document location.

In accordance with one or more embodiments of the invention, occlusion of images and text has been mitigated by adjusting only the luminance channel of the file used to print a page containing EMMs. In accordance with one embodiment, the EMM varies the luminance of the underlying image in a limited range. Luminance information was chosen because it is reproduced with good fidelity by both color and monochrome copy machines and printers. In this embodiment, both the large bounding circle and the smaller circle add to the underlying image's luminance while a drop shadow effect diminishes it.

In accordance with one or more embodiments of the invention, occlusion of images and text also can been mitigated with simply choosing a light color for the EMMs, thickness of the lines, size of the dots, locating dots between the spaces or gaps of the contents or the like, such that the EMMS don't disturb the contents on the document but are visible enough for users.

In accordance with one or more embodiments of the invention, the smaller, interior, circle 202 contains a media icon 203 and an anchor point arrow 205. The media icon 203 is a simple icon that graphically depicts the type of media being linked to (e.g audio or video). This icon 203 is depicted within the small circle 202 as an area with no increase in luminance and by the previously described drop shadow effect. The anchor point arrow 205 is depicted as a small arrow pointing away from the center of the circle 202 that it is adjacent to. The arrow 105 points to a user specified region on the page. The arrow's appearance exactly matches that of the circle it is associated with.

Embodiment of EMM Placement Procedure and Algorithm

1. EMM Placement Rules and Procedures

In accordance with one or more embodiments of the invention, the EMM authoring process may involve loading the original document to an EMM authoring editor. The entire local image feature of each page can then be extracted and subsequently stored to temporary memory. After receiving a link point and the linked medium from the user, the process may then determine the size and the position of the EMM using the local image feature in the temporary memory; determine the local image features within the EMM, be operable to receive a save and/or a print request after edits from the user, and subsequently store the local image features within the EMM and the linked medium URL or file into the database. The feature database structure for the process may include the ID number of the EMM, a set of local image features, with each feature including a set of vectors corresponding to key points, and a local or internet address of the embedded digital medium.

Alternatively, the authoring process may store all of the image features of an entire page into the feature database. In determining the size and the position of the EMM through use of the local image features in the local temporary memory, the process may thus involve retrieving the image features from the database based on the position of the link input received. Then, when the process stores the local image features, the process can thus copy the image feature within the EMM to another reference table database along with the associated digital medium address.

Extracted features from each page can also simply be saved into the temporary memory. After the authoring tool decides the EMM position, adds the EMM to the page, crops the neighborhood of the EMM (including the EMM overlap), re-computes visual features in the cropped EMM image and saves these features in the DB. Thus, fewer features need to be saved for each EMM and the DB can thereby handle more EMMs. Additionally, the re-computed feature with the overlapping EMM can also be matched better with the user's capture.

In accordance with one or more embodiments of the invention, the EMM construction mainly focuses on readers' demands to multimedia enhanced paper. To make the embodiments of the inventive system serve users better, care was taken to consider the demand from a machine's point of view. More specifically, an embodiment of the inventive EMM was arranged such that it can improve instead of degrading a paper patch identification process. To achieve this goal, an algorithm was devised to adjust parameters for an EMM arrangement.

In accordance with one or more embodiments of the invention, there are three basic sets of parameters for an EMM adjustment: feature-boundary-circle center (X,Y), feature-boundary-circle radius R, and media-type-circle center (x,y). Since the patch identification accuracy does not change much if the quantity of patch-covered feature points is over a certain threshold enough to distinguish each of the EMM within the identification system, the boundary-circle optimization goal is to achieve good patch-identification accuracy with minimum cost of paper surface area. Small paper surface occupation by an EMM has following benefits to an embodiment of the inventive system:

1) The EMM will have fewer disturbances to original content.

2) Small surface area occupation makes it easier to put more separated EMMs in every page.

3) Since only the keypoints need to be indexed, such as SIFT/SURF/FIT keypoints, described above, in the circle for patch identification, small surface area occupation reduces the quantity of keypoints saved on the index server. The reduced keypoint quantity is helpful for increasing identification speed.

4) The marked small area may guide a reader to submit a patch without too much computation (the quantity of keypoints is controlled by the circle), and save the reader's waiting time for retrieving multimedia data.

5) Keeping the capture-area-low-limit small also makes it more convenient for cell phone capture. More specifically, capturing a large circle needs a large distance between the cell phone and paper while capturing a small circle is more flexible in a large dynamic range.

In accordance with one or more embodiments of the invention, to get a small radius for the feature-boundary-circle, the inventive algorithm will locate the boundary-circle at a place with high keypoint density and shrink the radius to meet the minimum keypoint quantity requirement.

In accordance with one or more embodiments of the invention, with paper patch identification algorithms described in previous sections, the feature-boundary-circle is normally much larger than the minimum visibility requirement. In accordance with one embodiment of the inventive algorithm, the circle surrounding the media-type-icon inside the feature-boundary-circle is determined to make sure readers consider them as one EMM. To reduce the disturbances caused by the icon-circle, an embodiment of the inventive algorithm tries to move this circle to a place with minimum keypoint density. More specifically, with the icon-circle size fixed, it is expected that the circle will include a minimum quantity of keypoints in the original document. This procedure has the following benefits for the patch identification process.

1) The media-type-icon and its surrounding circle have fewer disturbances to important features. This can be helpful for a reader to separate the original content and the icon so that the reader can have a better understanding to the original document.

2) Because the media-type-callout is mainly formed with semi-transparent skeletons and shadows, the callout and original document content may form more distinctive keypoints in keypoint sparse regions. This keypoint density balancing process is useful for a machine to detect more uniform-distributed keypoints and therefore get more stable coordinate transform matrix for cell phone pose estimation. Moreover, a more stable matrix is also useful for removing matching outliers and further improving patch identification accuracy.

In accordance with one or more embodiments of the invention, besides these basic optimization approaches, some additional rules are used to make an EMM look nicer and more consistent in various situations. These rules include:

1) The anchor point should be inside the feature-boundary-circle. It makes the EMM more intuitive. It reduces the circle searching space. Moreover, it avoids merging multiple EMMs on the same page to the same location (a global optimal position).

2) The media-type-icon and its surrounding circle should not cover the document creator selected anchor point. In this way, there can always be an arrow pointing outside from the circle and that gives EMMs a more consistent outlook at various locations.

3) To make the arrow shorter, the algorithm forces the iconic callout move closer to the anchor point.

4) All EMMs would use the same lighting source at infinite distance for their shadows.

5) In one implementation, it is assumed that an EMM model has a three-level construction in a 3D space for shadows.

6) In certain embodiments, the light for shadows comes from up-left at an infinite distance.

2. A Fast Algorithm for Estimating the Quantity of Points in a Circle

In accordance with one or more embodiments of the invention, to get an optimal location and size for a feature-boundary-circle or an optimal location for an iconic callout circle, the system has to count the quantity of keypoints inside a circle. If an EMM changes image local features dramatically, the system has to re-compute all features in an EMM-signified patch when a set of new parameters (i.e. location and size) are tested. This kind of procedure will make it difficult to get an optimal parameter set in reasonable time. Since our EMMs according to various embodiments of the invention mainly include edges and shadows, adding an EMM in a document patch will not decrease the quantity of keypoints much. Since an EMM edge can form new features with original contents close to the edge and an EMM transparent region will not have much impact to the original features, it is more likely that an EMM will increase the quantity of keypoints in its local region. With this consideration in mind, keypoint distribution in a page can be safely utilized without an EMM to estimate the quantity of real features in an EMM feature boundary circle or an EMM media-type-icon boundary.

In accordance with one or more embodiments of the invention, even if the inventive system can skip feature re-computation for testing each set of EMM parameters, the system still has to count the number of keypoints inside a circle with many different circle parameters. More specifically, the system may need to try the position of every pixel as a circle center. Moreover, it may also try multiple radiuses before an optimal solution is reached. Therefore, the algorithm for estimating the number of points in a circle has to be fast for a practical application.

In accordance with one or more embodiments of the invention, the number of keypoints, n, of a normally scanned 100 DPI page may reach several thousands. Assume we use a brute-force searching approach, the computation complexity for estimating the number of keypoints in a circle will be $O(n)$. This is too time-consuming for practical use.

Figure 3:
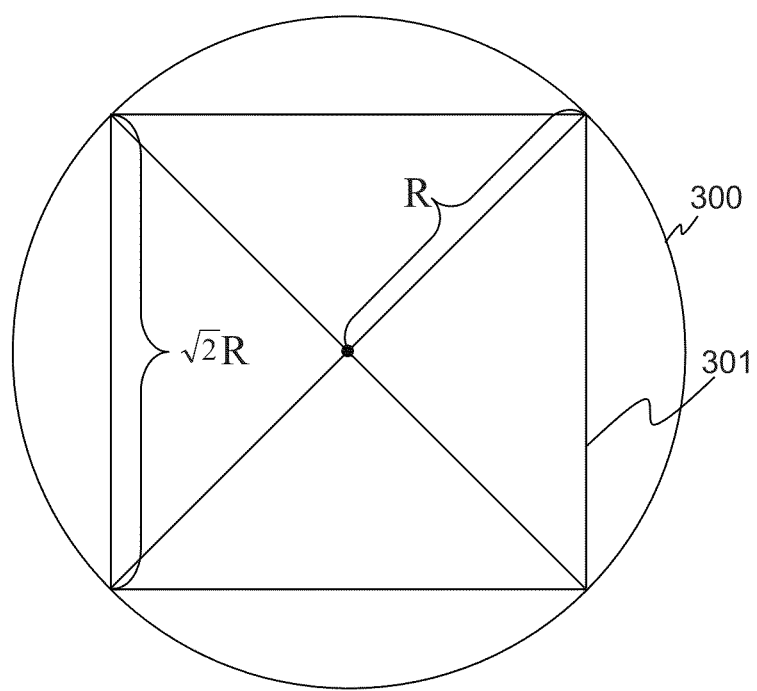
FIG. 3 illustrates a relationship between a circle and a square for keypoint quantity estimation within the circle.

In accordance with one or more embodiments of the invention, to overcome this computation complexity problem, we designed a fast algorithm for estimating the quantity of points in a circle. The algorithm is based on the integral image of a keypoint distribution histogram. To use this algorithm, we approximate the quantity of keypoints in a circle with radius R with the quantity of keypoints in a square inside the circle having sides of length $\sqrt{2}R$. The relationship between the circle 300 and the square 301 is illustrated in FIG. 3. Denote Nc as the quantity of keypoints in the circle 300 and Ns as the quantity of keypoints in the square 301, we can get Ns≤Nc. This approximation can guarantee enough keypoints in the circle for patch identification when the quantity of keypoints in the square reaches the patch identification low limit.

Figure 4:
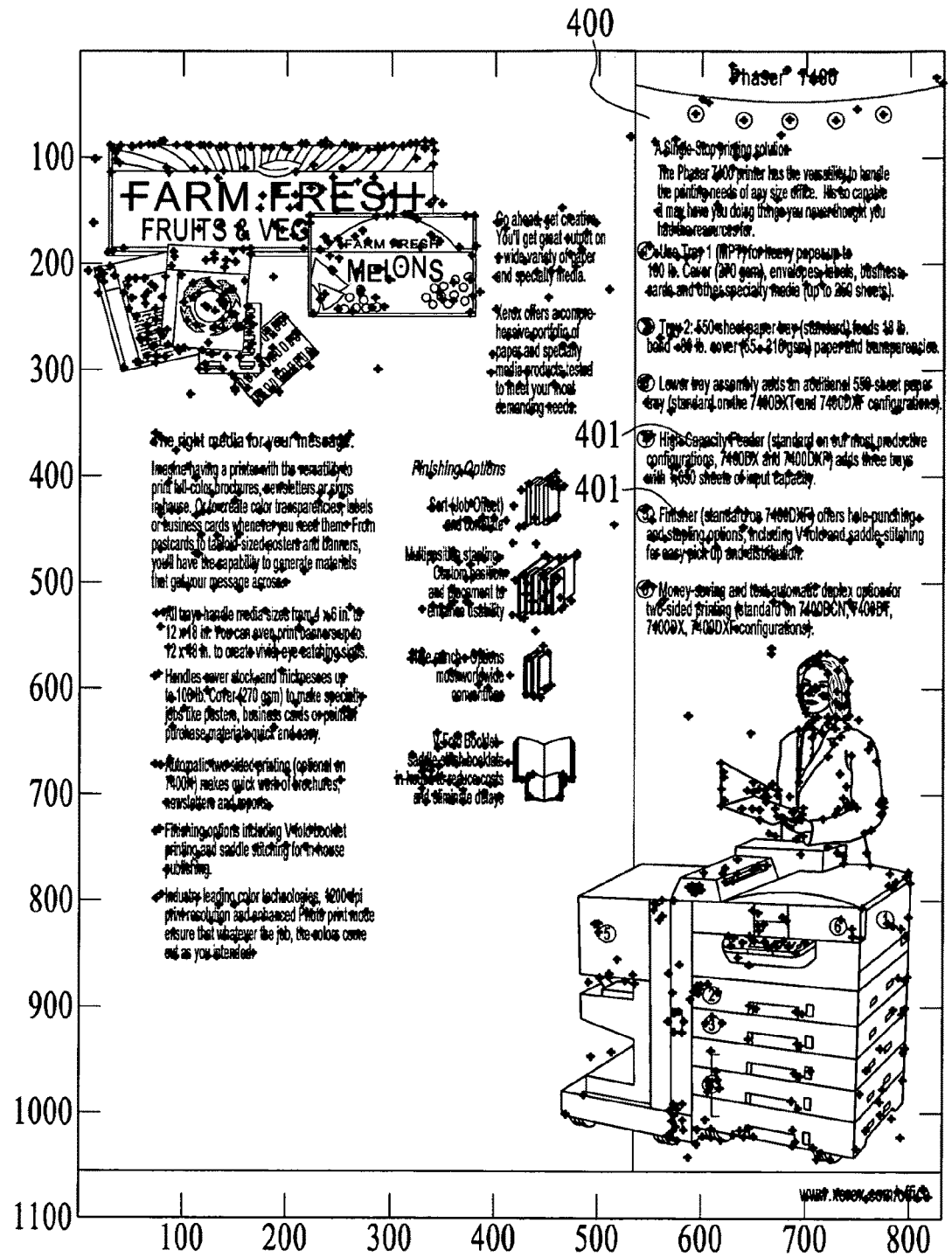
FIG. 4 shows keypoints overlaid on top of a brochure page.
Figure 5:
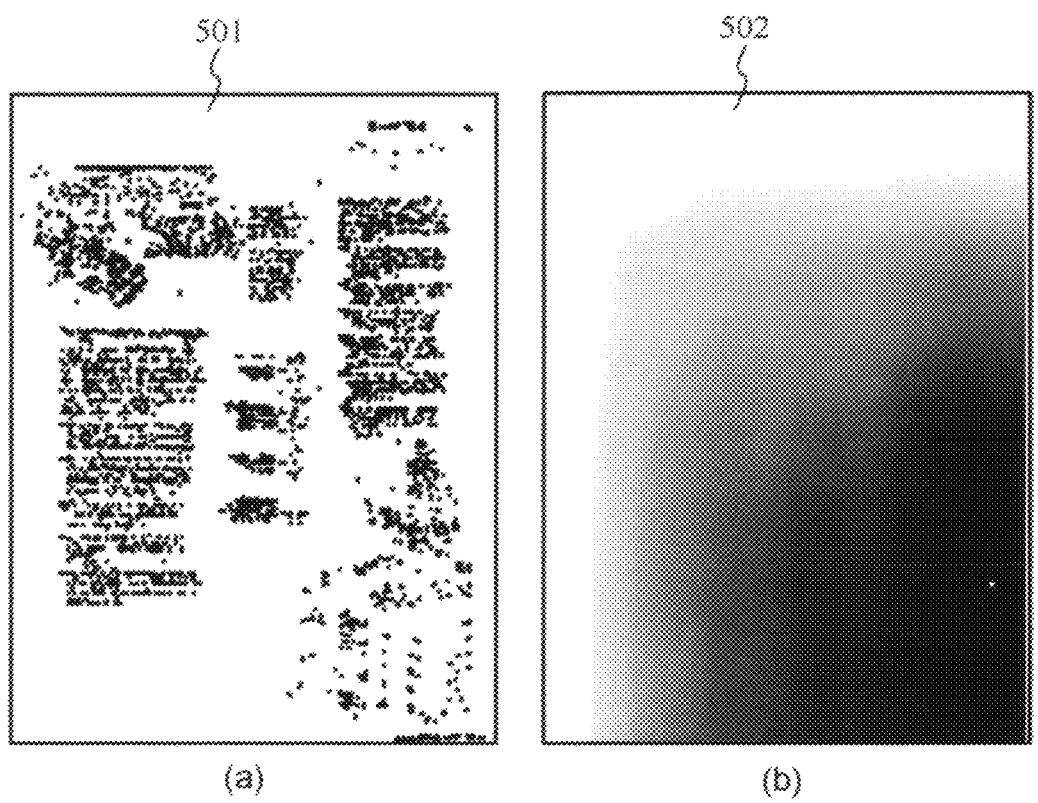
FIG. 5(*a*) shows the keypoint distribution map and FIG. 5(*b*) shows a cumulative keypoint distribution map.

In accordance with one or more embodiments of the invention, FIG. 4 shows keypoints 401 overlaid on top of a brochure page 400. Corresponding to the image in FIG. 4, FIG. 5(a) shows the keypoint distribution map 501 where each black color point in the white map is a keypoint. FIG. 5(b) shows a cumulative keypoint distribution map 502 where each point has an intensity value that is equal to the number of keypoints in the rectangular box between the origin and the point. In the cumulative keypoint distribution map, the value at each point is equal to the quantity of keypoints in its top-left region. Assume the quantity of pixels in an image is N, the computational complexity for getting this cumulative keypoint distribution map is $O(N)$. Since the algorithm only needs to compute this map once and the system can pre-compute this map for each image, the computational complexity of this map will not affect the optimization much when a document creator uses this approach to get an optimal EMM arrangement.

Figure 6:
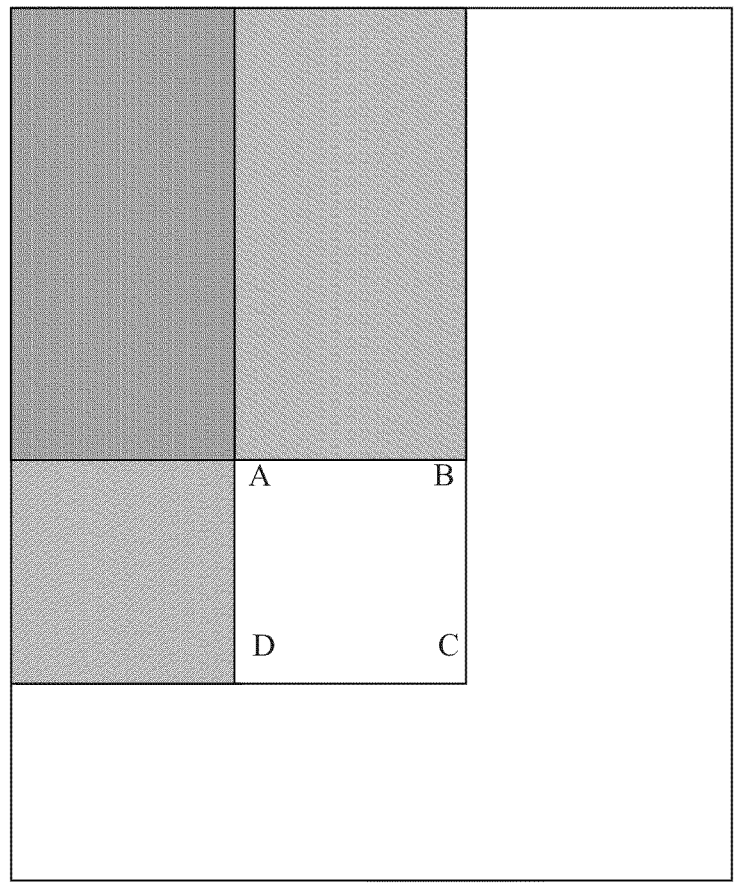
FIG. 6 illustrates an embodiment of an inventive method for computing the quantity of keypoints in a square.

In accordance with one or more embodiments of the invention, with the cumulative keypoint distribution map, the system can compute the quantity of keypoints in a square in constant time. Assume a square, ABCD in FIG. 6, has its sides parallel to one image boundary or the other and the values for the points A, B, C, and D on the cumulative distribution map are NA, NB, NC, ND respectively, see FIG. 6. In conjunction with the circle of FIG. 3, the system utilizes the number of keypoints in the square to estimate the number of keypoints in the circle. The cumulative keypoint distribution of FIG. 5 can be utilized to calculate the number of keypoints within a square. The system can determine the quantity of keypoints in the square ABCD, NSQ, with the following equation:

$$N_{SQ} = N_A + N_C - N_B - N_D$$

In accordance with one or more embodiments of the invention, from this equation, the system can determine the quantity of keypoints in a square with one addition and two subtractions. This is much more efficient than the brute-force approach, which uses two multiplications, two additions and one subtraction to verify each keypoint. For example, if a user wishes to search an optimal circle center in a page, which has 3000 keypoints, the computation used by the fast algorithm will be about 3800 times faster.

3. Determine an Optimal Feature-Boundary-Circle

In accordance with one or more embodiments of the invention, with the fast algorithm for estimating the quantity of keypoints in a circle, the system can try placing a circle center at the position of every pixel. Moreover, the system also needs to know the optimal radius for the best feature-boundary-circle. To get the optimal radius, an embodiment of the invention uses the following binary search approach for optimization:

while ((radiushigh−radiuslow)>SMALLMARGIN)
Get a circle center location that allows the circle to include the anchor point and the maximum quantity of keypoints with this radius if maximum quantity of keypoints with this radius>KEYNUMLOWLIMIT

```
radiushigh = currentradius;
else
radiuslow = currentradius;
end
currentradius = (radiushigh + radiuslow)/2;
end
```

If multiple circle radiuses between 125 and 250 are used, the binary search approach is about 18 times faster.

4. Determine an Optimal Surrounding Circle for an Media-Type-Icon

In accordance with one or more embodiments of the invention, because a media-type-icon has a fixed size, getting the optimal location of this circle is to get a circle location that allows the circle to include minimum quantity of keypoints. Besides this optimization, the previously mentioned rules 2 and 3 can be utilized to make an EMM look nicer. In other words, the distance between the surrounding circle center and the anchor point should be larger than the radius of the surrounding circle. Moreover, the surrounding circle should be 'close' to the anchor point for a short pointing arrow. There are several ways to make the arrow short. One way is to set the maximum distance between the anchor point and the surrounding circle center. Another approach is to compute a vector from (X,Y) to (x,y) and a vector from (X,Y) to (m,n), and force the angle between these two vectors smaller than 90°. We take the second approach in our current implementation.

Generate Graphical Effect for EMM

Figure 7:
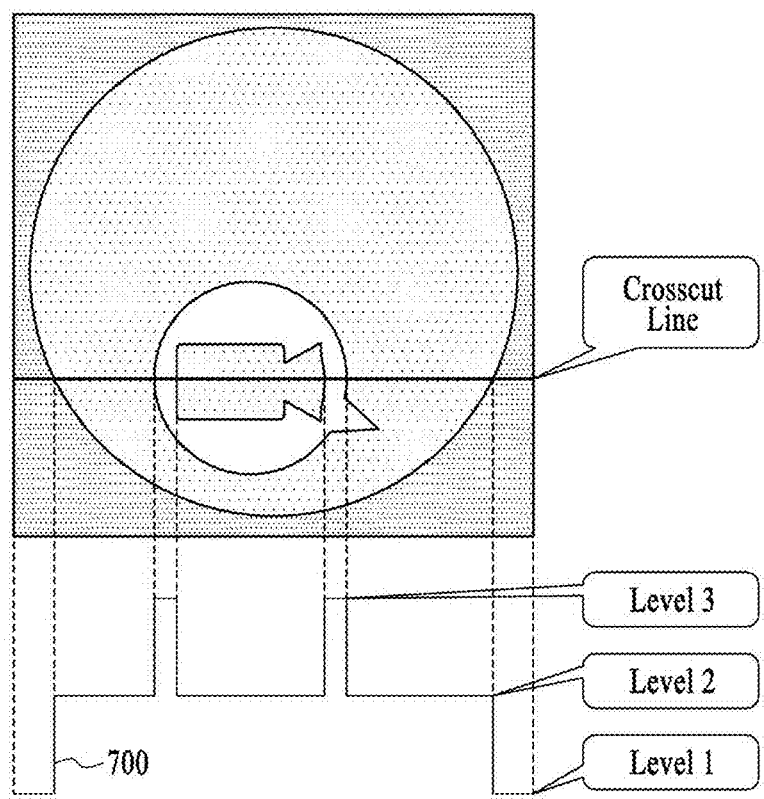
FIG. 7 illustrates an EMM model having a three-level construction in a 3D space.
Figure 8:
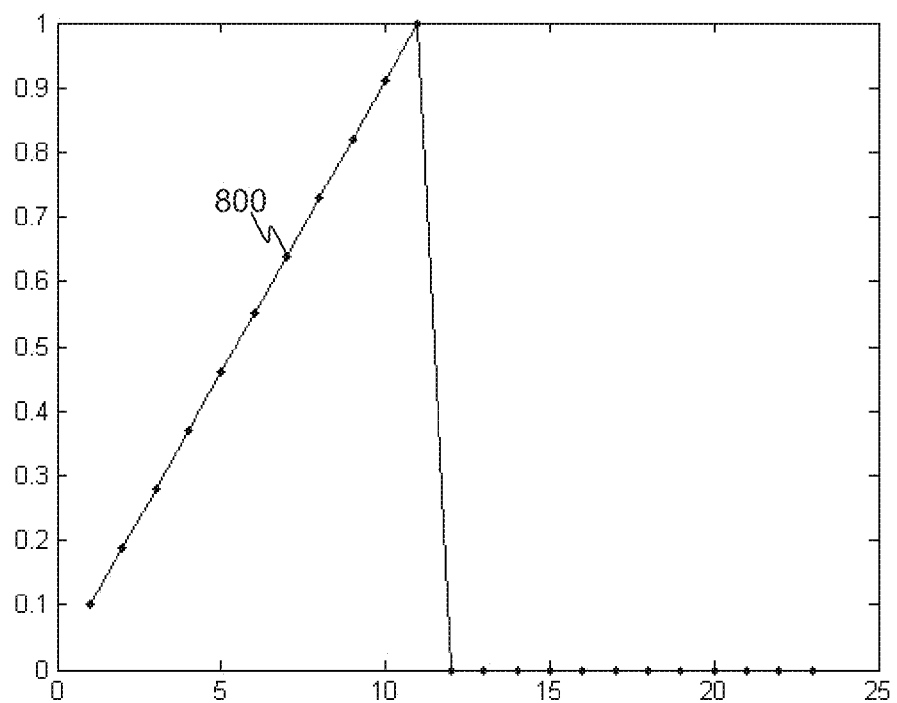
FIG. 8 illustrates a shape of a 2D filter in its diagonal direction.

In accordance with one or more embodiments of the invention, because graphical objects in a paper document are mainly in 2D space, adding 3D graphical effects to EMMs may further facilitate the separation of EMMs from other graphical objects in original document. In our current implementation, we use a three-level EMM model in 3D space for shadows. The three-level EMM model 700 is illustrated in FIG. 7. For shadows, it is assumed that the light comes from the top-left of a document. To mimic this effect, a sobel filter followed by a 2D filter can be used. The sobel filter has coefficients [1 0; 0 −1]. The 2D filter has the shape 800 shown in FIG. 8 in its diagonal direction, and has zero coefficients for all other filter positions.

Figure 9:
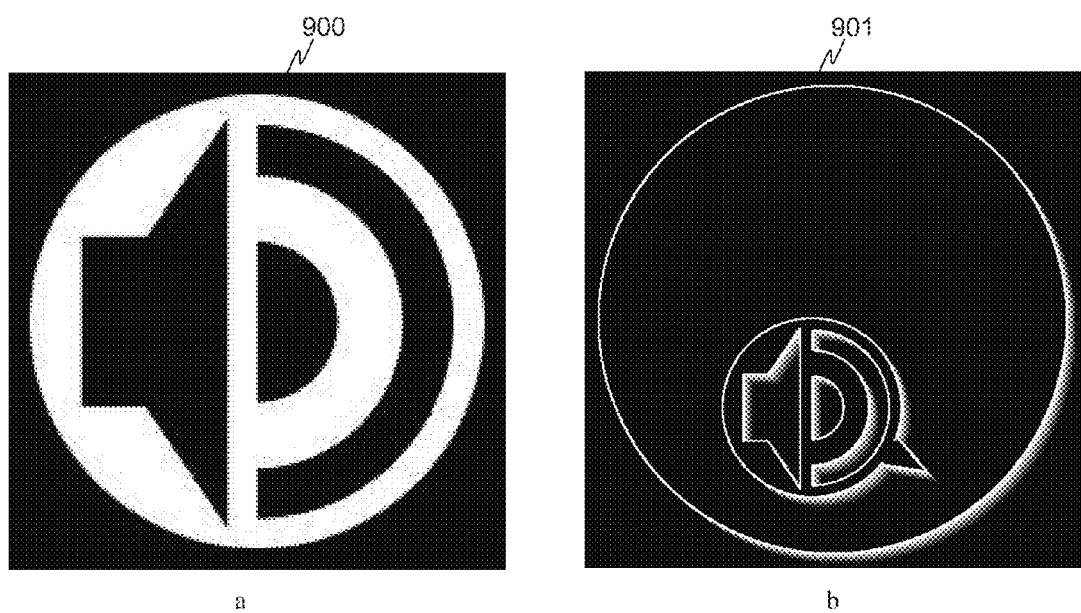
FIG. 9(*a*) illustrates a typical black and white multimedia icon and FIG. 9(*b*) illustrates an EMM decorated with graphical effects.

In accordance with one or more embodiments of the invention, by combining the filtering result with an EMM edge, the system can generate proper EMM graphical effects based on each black and white multimedia icon. FIG. 9 illustrates a typical black and white multimedia icon 900 and an EMM 901 decorated with graphical effects. Because the arrow is dynamically added to the 3-level EMM model after the optimal EMM parameter set is found, the arrow's graphical effects are properly blended with graphical effects for other EMM parts.

Figure 10:
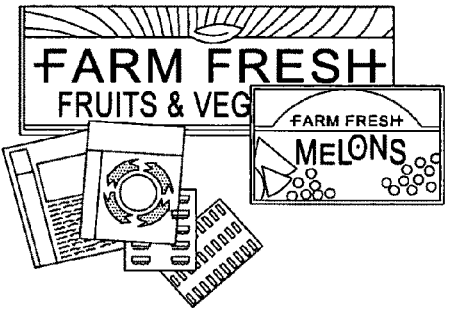
FIG. 10 shows the effect of alpha blending an EMM with a document page.

In accordance with one or more embodiments of the invention, FIG. 10 shows the effect of alpha blending an EMM with a document page 1000.

Figure 11:
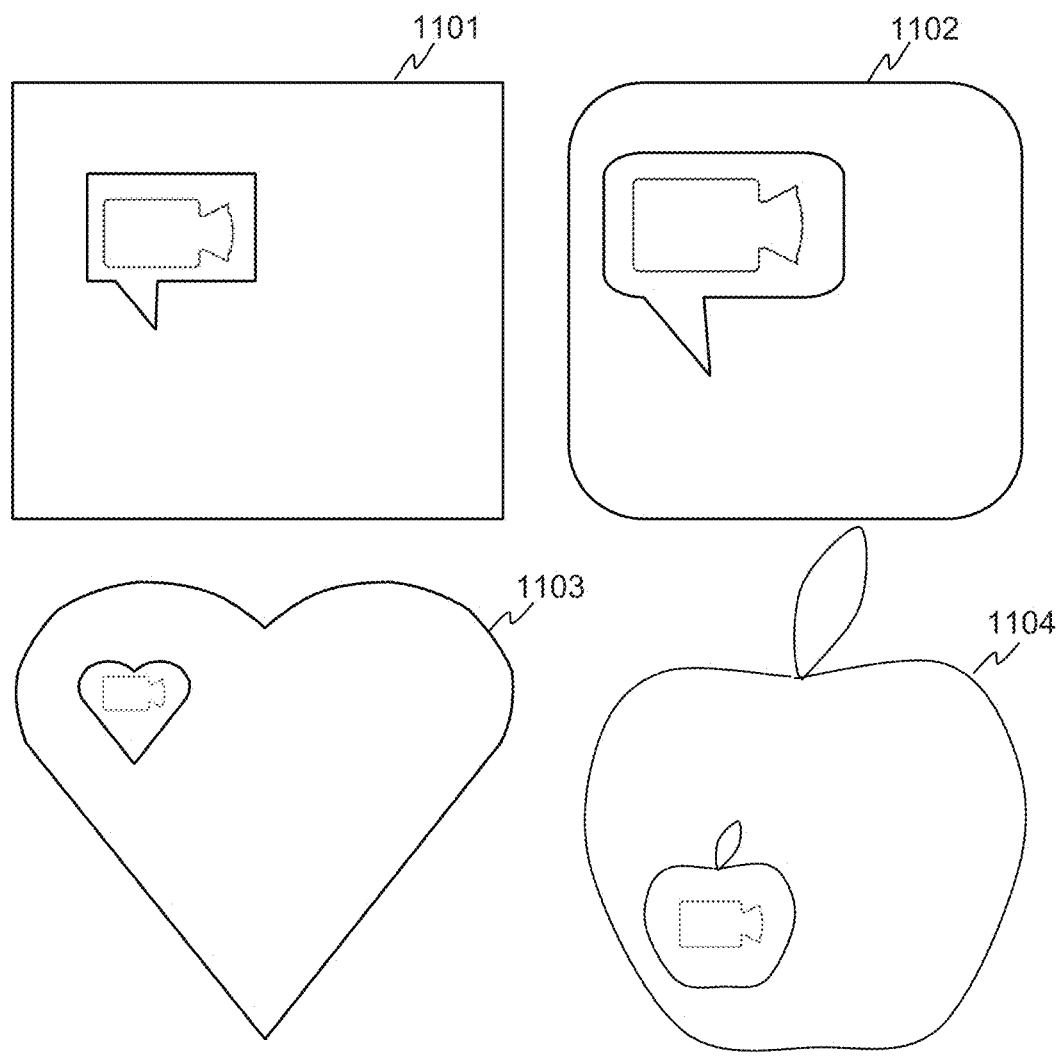
FIG. 11 shows certain irregular-shape EMMs.

In accordance with one or more embodiments of the invention, in practice, users may want to use EMMs in irregular shapes. Reasons for using irregular shape EMMs may include:
- If users can always capture a rectangular shape EMM in the right direction, a rectangular shape EMM may help the machine to speedup feature computation (skip orientation calculation).
- For different purpose, such as holiday celebration or brand enhancement, an EMM may have different irregular shapes.
- Properly changing EMM shapes may also help EMM-signified patch identification.
- EMM shapes may also be used to convey other information.
- Changing EMM shapes may be considered for further reducing interferences to the original document. FIG. 11 shows some irregular-shape EMMs 1101-1104.

Figure 12:
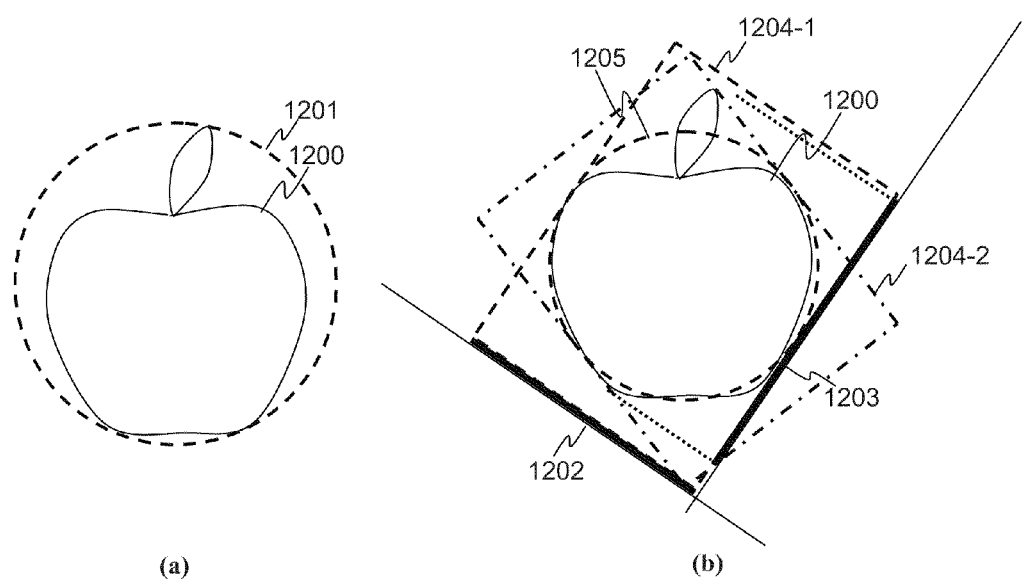
FIG. 12 illustrates two methods for positioning of an irregular-shape EMM.
Figure 13:
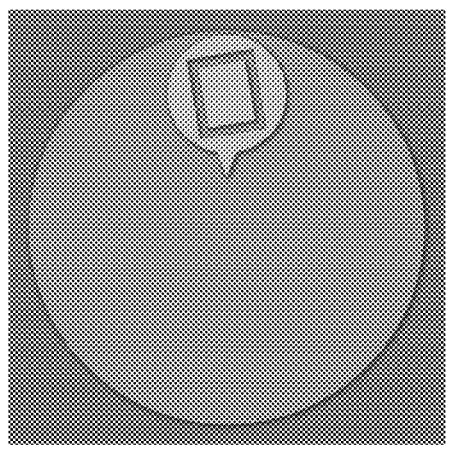
FIGS. 13-17 illustrate certain exemplary ornamental designs of EMMs.
Figure 14:
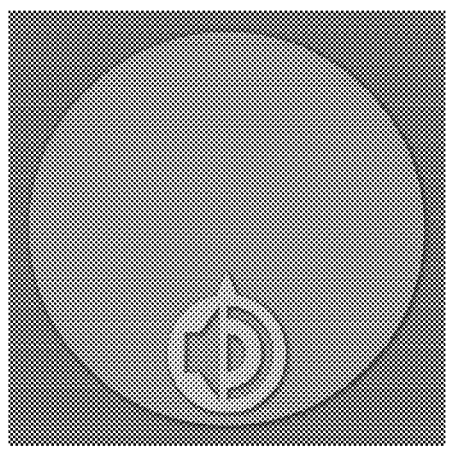
Figure 15:
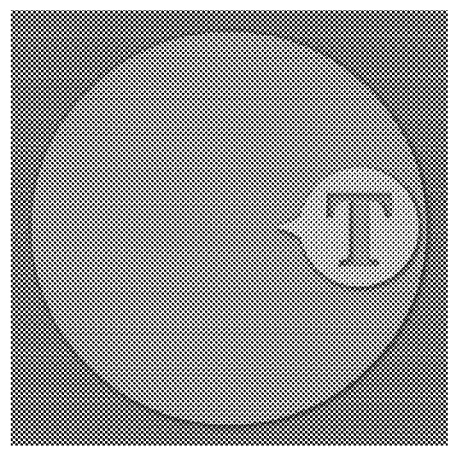
Figure 16:
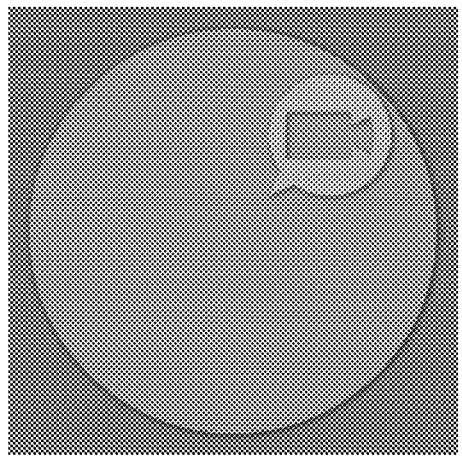
Figure 17:
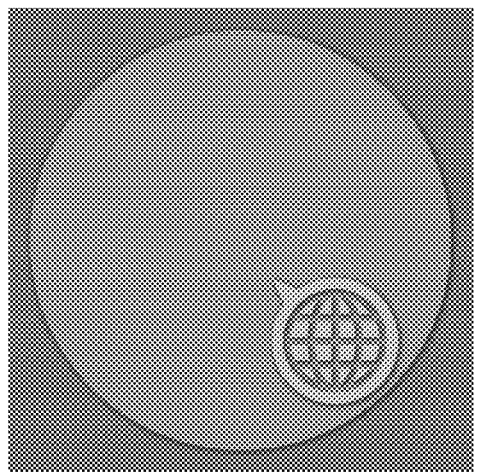

In accordance with one or more embodiments of the invention, one simple approach for positioning irregular-shape EMMs 1200 is to fit irregular-shape components of an EMM in optimized circles 1201 for disk-shape EMMs. FIG. 12 (*a*) illustrates this approach. This approach is simple. However, assume the whole irregular-shape-EMM is captured, this approach cannot guarantee enough keypoints in the captured image. Assuming the whole irregular-shape-EMM is captured, the following approach (illustrated in FIG. 12 (*b*)) can guarantee enough keypoints in the captured image.

1. Project the irregular shape 1200 in two perpendicular directions to produce two sets of projections 1202 and 1203.
2. For each set of projections 1202 and 1203, generate a plurality of fixed-aspect-ratio (e.g. 4:3) bounding rectangles each having different rotation angles 1204-1, 1204-2 of the irregular shape. The number of rectangles and the rotation angles can be set to a predetermined number or engineered so as to make the rectangles fit on the periphery of the EMM at as many angles as possible.
3. Find the reference circle 1205 that can be covered by all rectangles.
4. Get the 2D vector between the circle center of the reference circle (i.e., the optimal position) and the irregular shape anchor point.
5. Get the reference circle 1205 radius (i.e. the optimal radius) which indicates the optimal size of the reference circle.
6. After getting the optimal position and circle size, use the ratio of the real-circle-radius to the reference-circle-radius to scale the 2D vector and the irregular shape for positioning the irregular shape 1200.

In accordance with one or more embodiments of the invention, the performance of the underlying document retrieval system has been evaluated on a scanned document database and the EMM retrieval precision is above 99%.

Exemplary EMM Designs

Certain exemplary ornamental designs of the EMMs, indicating availability of various digital media types, are illustrated in FIGS. 13-17. The ornamental design of various embodiments of EMMs are characterized by the following features:

1. EMMs are typically printed on a surface (e.g. paper, plastic). Printing can be accomplished via, offset press, flexography, dye transfer, inkjet, laser printing, pad printing, relief print, rotogravure, screen-printing, electro-photography or any other method that produced a mark on a surface.

EMMs may also appear on video displays (e.g. e-readers, LCD monitors, and e-paper)

2. EMMs have a feature boundary, such as a large circle surrounding a media type icon boundary, such as a smaller circle. The smaller circle features a media type icon, which preferably is a simple icon, and an attached pointing arrow (see FIGS. 13-17). This homogeneity in appearance of the EMMs is designed to allow users to find the EMMs on a page very quickly. This is similar to the simple colored and underlined hyperlink on a traditional web page.

3. The arrangement of the media type icon boundary (smaller circle) within the feature boundary (larger circle) is variable (see FIGS. 13-17).

4. The position and orientation of the attached arrow is variable (see FIGS. 13-17).

5. The size relationship between the media type icon boundary (smaller circle) and the feature boundary (larger circle) is variable.

6. EMMs overlay other marks on a printed page. Occlusion of the underlying marks can be mitigated by adjusting only the luminance channel of the file used to print the page containing the EMM and an underlying image. Embodiments of the EMM vary the luminance of the underlying image. Luminance information can be chosen because it is reproduced with good fidelity by both color and monochrome printing techniques. The visual effect of this is a light, semi-transparent mark that overlaps the content on a printed page.

7. The edges of the EMMs' are defined by a drop shadow (see FIGS. 13-17). All boundaries are so defined. The luminance effect of the drop shadow is roughly the inverse of the luminance effect applied to the body of the mark. The visual effect of this is a dark, semi-transparent shadow around the EMMs' borders and the borders of the interior icon.

Method of Providing a Digital Medium

Figure 18:
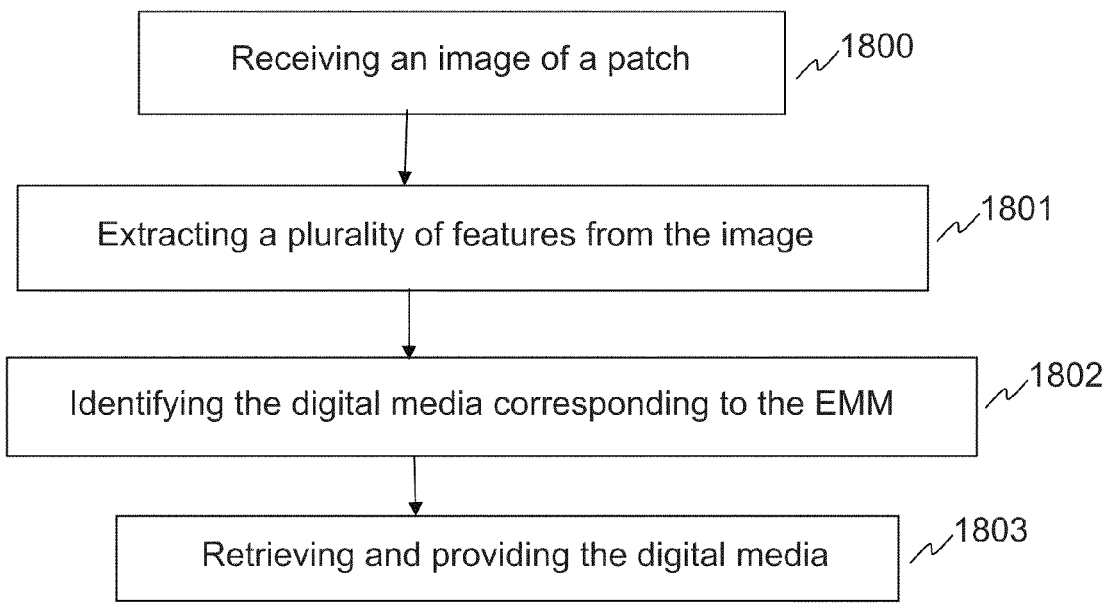
FIG. 18 is a flow chart that illustrates a method for providing a digital medium by making use of a database and an article according to one of the embodiments of the invention.

FIG. 18 illustrates an example flow chart of a method for providing a digital medium by making use of a database and an article according to one of the embodiments of the invention. In accordance with one of the embodiments of the invention, upon receiving an image of a patch 1800, a plurality of features are extracted from the image 1801, and digital media corresponding to the EMM is identified 1802. If need be, the digital media is then retrieved and provided 1803. The features that are extracted from the image may include the keypoints which indicate to the system what index needs to be retrieved.

Method of Producing an Article

Figure 19:
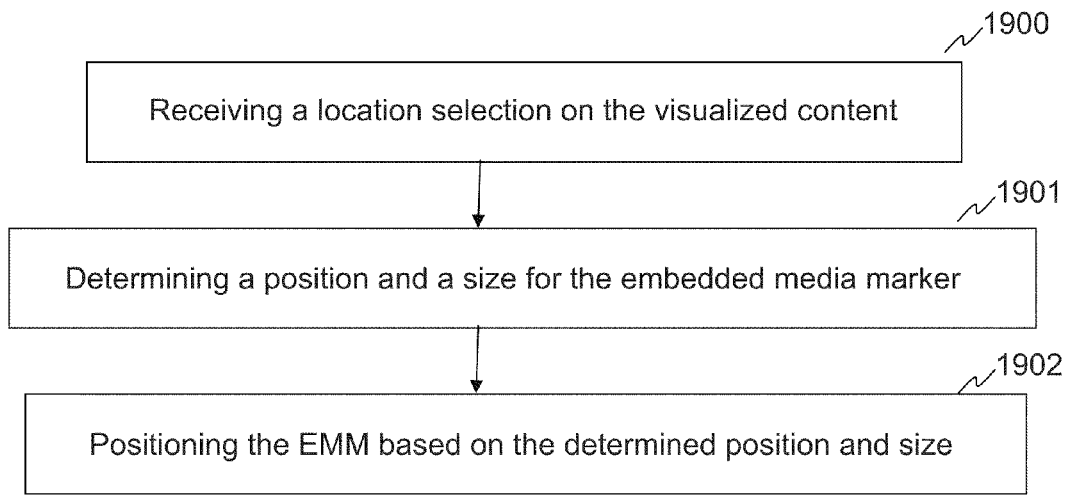
FIG. 19 is a flow chart that illustrates a method of producing an article including a visualized content and an embedded media marker on the content.

FIG. 19 illustrates an example flow chart for producing an article including a visualized content and an embedded media marker on the content. First, the system receives a location selection of the visualized content 1900. From the selection, a position and size is determined for the EMM 1901. Subsequently, the EMM is positioned based on the determined position and size 1902.

Figure 20:
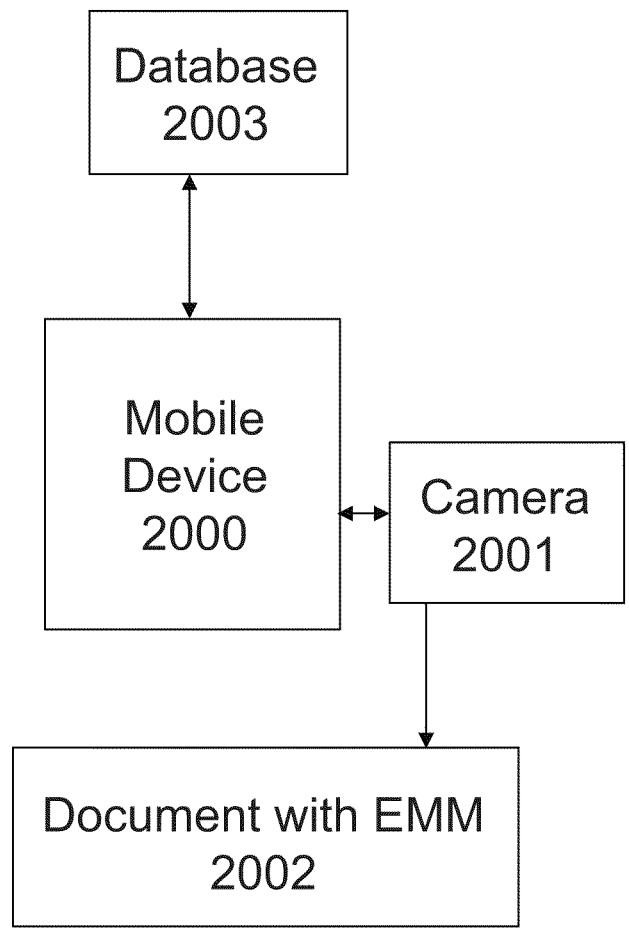
FIG. 20 illustrates an example a functional diagram of a system according to an embodiment of the invention.

FIG. 20 illustrates an example functional diagram of the system. A mobile device 2000 with a camera 2001 focuses onto a document that contains an EMM 2002, and provides feedback to the mobile device. Upon the detection of an EMM, the mobile device references a database 2003 to determine the type of content the EMM is referenced to. The database returns information back to the mobile device, and the mobile device may then execute the content.

Exemplary Mobile Platform

Figure 21:
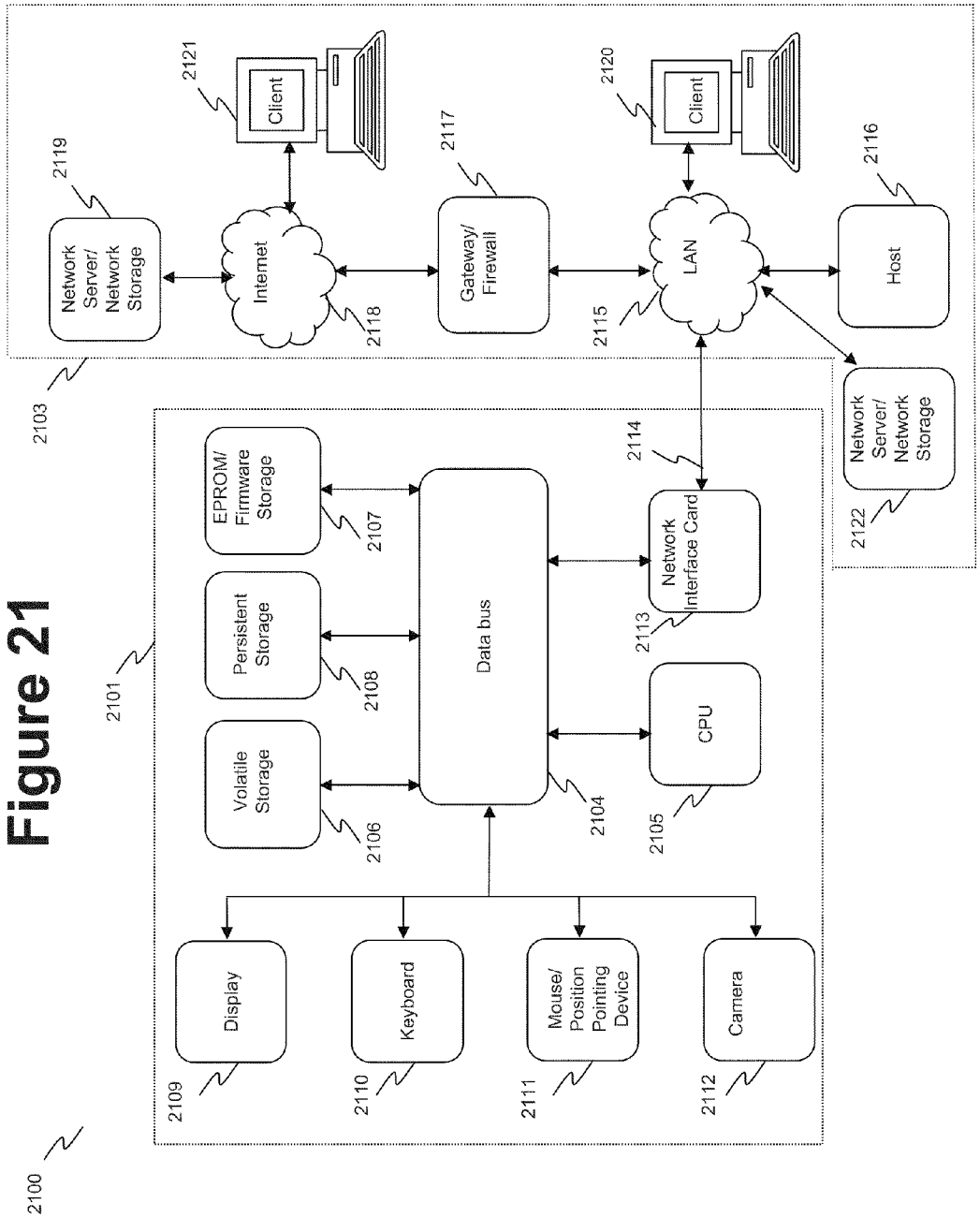
FIG. 21 illustrates an exemplary embodiment, such as a mobile platform, upon which the inventive system may be implemented.

FIG. 21 is a block diagram that illustrates an embodiment of a mobile platform/remote server system 2100 upon which an embodiment of the inventive methodology may be implemented. The system 2100 includes a mobile platform 2101 21 and network resources 2103.

The mobile platform 2101 may include a data bus 2105 or other communication mechanism for communicating information across and among various parts of the mobile platform 2101, and a processor 2105 coupled with bus 2101 for processing information and performing other computational and control tasks. Mobile platform 2101 also includes a volatile storage 2106, such as a random access memory (RAM) or other dynamic storage device, coupled to bus 2105 for storing various information as well as instructions to be executed by processor 2105. The volatile storage 2106 also may be used for storing temporary variables or other intermediate information during execution of instructions by processor 2105. Mobile platform 2101 may further include a read only memory (ROM or EPROM) 2107 or other static storage device coupled to bus 2105 for storing static information and instructions for processor 2105, such as basic input-output system (BIOS), as well as various system configuration parameters. A persistent storage device 2108, such as a magnetic disk, optical disk, or solid-state flash memory device is provided and coupled to bus 2101 for storing information and instructions.

Mobile platform 2101 may be coupled via bus 2105 to a display 2109, such as a cathode ray tube (CRT), plasma display, or a liquid crystal display (LCD), for displaying information to a system administrator or user of the mobile platform 2101. The display 2109 may be used for viewing of the digital media associated with the inventive EMM. An input device 2110, including alphanumeric and other keys, is coupled to bus 2101 for communicating information and command selections to processor 2105. Another type of user input device is cursor control device 2111, such as a mouse, a trackball, or cursor direction keys for communicating direction information and command selections to processor 2105 and for controlling cursor movement on display 2109. This input device typically has two degrees of freedom in two axes, a first axis (e.g., x) and a second axis (e.g., y), that allows the device to specify positions in a plane.

A camera 2112 may be coupled to the mobile platform 2101 via bus 2105 to be used for taking a picture of the object having the inventive EMM.

The invention is related to the use of computer system 2100 for implementing the techniques described herein. In an embodiment, the inventive system may reside on a machine such as mobile platform 2101. According to one embodiment of the invention, the techniques described herein are performed by computer system 2100 in response to processor 2105 executing one or more sequences of one or more instructions contained in the volatile memory 2106. Such instructions may be read into volatile memory 2106 from another computer-readable medium, such as persistent storage device 2108. Execution of the sequences of instructions contained in the volatile memory 2106 causes processor 2105 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2105 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 2108. Volatile media includes dynamic memory, such as volatile storage 2106.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 2105 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 2105. The bus 2105 carries the data to the volatile storage 2106, from which processor 2105 retrieves and executes the instructions. The instructions received by the volatile memory 2106 may optionally be stored on persistent storage device 2108 either before or after execution by processor 2105. The instructions may also be downloaded into the mobile platform 2101 via Internet using a variety of network data communication protocols well known in the art.

The mobile platform 2101 also includes a communication interface, such as network interface card 2113 coupled to the data bus 2105. Communication interface 2113 provides a two-way data communication coupling to a network link 2115 that is coupled to a local network 2115. For example, communication interface 2113 may be an integrated services digital network (ISDN) card or a modem to provide a data communication connection to a corresponding type of telephone line. As another example, communication interface 2113 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2113 sends and receives electrical, electromagnetic or optical signals that carry digital data streams representing various types of information.

Network link 2113 typically provides data communication through one or more networks to other network resources. For example, network link 2115 may provide a connection through local network 2115 to a host computer 2116, or a network storage/server 2122. The storage/server 2122 may be used to store and retrieve the digital media associated with the inventive EMM, said digital media may be sent to the mobile platform 2101 via the network 2115. Additionally or alternatively, the network link 2113 may connect through gateway/firewall 2117 to the wide-area or global network 2118, such as an Internet. Thus, the mobile platform 2101 can access network resources located anywhere on the Internet 2118, such as a remote network storage/server 2119. On the other hand, the mobile platform 2101 may also be accessed by clients located anywhere on the local area network 2115 and/or the Internet 2118. The network clients 2120 and 2121 may themselves be implemented based on the mobile platform similar to the platform 2101.

Local network 2115 and the Internet 2118 both use electrical, electromagnetic or optical signals that carry digital data streams. The signals through the various networks and the signals on network link 2115 and through communication interface 2113, which carry the digital data to and from mobile platform 2101, are exemplary forms of carrier waves transporting the information.

Mobile platform 2101 can send messages and receive data, including program code, through the variety of network(s) including Internet 2118 and LAN 2115, network link 2115 and communication interface 2113. In the Internet example, when the system 2101 acts as a network server, it might transmit a requested code or data for an application program running on client(s) 2120 and/or 2121 through Internet 2118, gateway/firewall 2117, local area network 2115 and communication interface 2113. Similarly, it may receive code from other network resources.

The received code may be executed by processor 2105 as it is received, and/or stored in persistent or volatile storage devices 2108 and 2106, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the system for generating and using embedded media markers and articles embodying such embedded media markers. It is intended that the specification and examples be considered as exemplary only, with a true scope and spirit of the invention being indicated by the following claims.

What is claimed is:

1. A computer-implemented method for providing a digital medium by making use of a database and an article, the database storing a set of information, corresponding to a portion of content visualized in a predetermined space, the set of information including (i) a plurality of local image features existing prior to placement of at least one embedded media marker and within the portion extracted from a local spatial arrangement of the content and (ii) an embedded digital media corresponding to the portion, wherein the portion of content has an area which includes the plurality of local image features sufficient to identify the portion of content, the article holding the portion of content and a placement of the at least one embedded media marker on said portion of content, the embedded media marker including a visible feature boundary enclosing the portion of the content, the method comprising:
   a. receiving, from a requestor, an image of a patch comprising an image of the placed embedded media marker, including the visible feature boundary, on the article;
   b. determining a location of the visible feature boundary in the image of the patch;
   c. based on the determined location of the visible feature boundary, extracting only local image features that are within the determined location of the visible feature boundary, from the image of the patch, and identifying the embedded media marker from the extracted local image features by comparing the extracted local image features to the plurality of local image features existing prior to the placement of the at least one embedded media marker of the set of information;
   d. identifying the embedded digital media corresponding to the embedded media marker;
   e. retrieving the identified embedded digital media from the database; and
   f. providing the retrieved digital media to the requestor.

2. The computer-implemented method of claim 1, wherein the embedded media marker further comprises a media-type indicator which comprises a media-type icon disposed within a media-type boundary, the media-type icon representing the type of media of the embedded digital media.

3. The computer-implemented method of claim 1, wherein the embedded media marker is alpha-blended with the visualized content of the article.

4. An article comprising:
   a. content visualized on a surface of the article; and
   b. an embedded media marker placed on the surface of the article, the embedded media marker corresponding to an embedded digital object, the embedded media marker overlaying the visualized content, the embedded media marker comprising a visible feature boundary enclosing a plurality of local image features of the visualized content extracted from a local spatial arrangement of the visualized content,
   wherein the embedded media marker is located such that the embedded media marker encloses ones of the plurality of the local image features within the feature boundary and causes a computer to identify the embedded digital object corresponding to the embedded media marker in response to the computer identifying the embedded media marker by (i) determining a location of the visible feature boundary in the image of the patch, (ii) based on the determined location of the visible feature boundary, extracting only local image features that are within the determined location of the visible feature boundary, and (iii) identifying the embedded media marker by comparing the extracted local image features to a plurality of local image features existing prior to the placement of the embedded media marker that are stored as index information.

5. The article of claim 4, wherein the article is a two dimensional surface medium.

6. The article of claim 4, wherein the embedded media marker is alpha-blended with the visualized content of the article.

7. The article of claim 4, wherein the embedded media marker further comprises a media-type indicator comprising a media-type boundary, wherein the media-type indicator is disposed within the feature boundary.

8. The article of claim 7, wherein the media-type indicator of the embedded media marker further comprises a media-type icon disposed within the media-type boundary, wherein the media-type indicator is a graphical indication of the type of media of the embedded media object.

9. The article of claim 7, wherein the media-type indicator further comprises an arrow pointing to a location within the visualized content and wherein the embedded media marker indicates availability of the digital media object associated with the location within the visualized content.

10. The article of claim 7, wherein the feature, wherein the media-type indicator is disposed within the feature boundary.

11. The article of claim 4, wherein one or more edges of the embedded media marker are defined by a drop shadow graphical effect.

12. The article of claim 4, wherein the embedded media marker comprises graphical effects that appear three-dimensional.

13. A computer-implemented method for producing an article including visualized content and an embedded media marker comprising a visible feature boundary on the content, the method comprising:
   a. receiving a user selection of a location on the visualized content of the article;
   b. determining a position and a size of the embedded media marker, including a location of the visible feature boundary, based on having at least a threshold quantity of local image features extracted from a local spatial arrangement of the visualized content near the selected location within the embedded media marker; and
   c. positioning the embedded media marker on the article based on the determined position and size, wherein the embedded media marker indicates availability of a digital media object associated with the location within the visualized content,
   wherein the location of the visible feature boundary is determined such that the selected portion of the content may be identified by extracting only a plurality of local image features that are within the determined location of the visible feature boundary.

14. The computer-implemented method of claim 13, further comprising alpha-blending of the embedded media marker with the visualized content of the article.

15. The computer-implemented method of claim 13, wherein the embedded media marker further comprises a media-type indicator comprising a media-type boundary, wherein the media-type indicator is disposed within the feature boundary.

16. The computer-implemented method of claim 15, wherein the media-type indicator of the embedded media marker further comprises a media-type icon disposed within the media-type boundary, wherein the media-type icon is a graphical representation of a type of media of the digital media object.

17. The computer-implemented method of claim 15, wherein the media-type indicator further comprises an arrow pointing to the location within the visualized content to which the digital medium object relates.

18. The computer-implemented method of claim 15, wherein the determining the position and size of the embedded media marker comprises determining at least one of a feature boundary circle center, a feature boundary circle radius, and media type circle center.

19. The computer implemented system of claim 18, wherein the determining a position and a size of the embedded media marker further comprises determining if sufficient local image features exist within the embedded media marker by estimating the number of local image features within the determined position and size of the embedded media marker.

20. The computer-implemented method of claim 13, wherein one or more edges of the embedded media marker are defined by a drop shadow effect.

21. A computer-implemented method for producing an article including visualized content and an embedded media marker comprising a visible feature boundary on the content, the method comprising:
   a. receiving a user selection of a location on the visualized content of the article;
   b. determining a position and a size of the embedded media marker, including a location of the visible feature boundary, based on having at least a threshold quantity of local image features extracted from a local spatial arrangement of the visualized content near the selected location within the embedded media marker; and
   c. positioning the embedded media marker on the article based on the determined position and size, wherein the embedded media marker indicates availability of a digital media object associated with the location within the visualized content,
   wherein the location of the visible feature boundary is determined such that the selected portion of the content may be identified by extracting only a plurality of local image features that are within the determined location of the visible feature boundary,
   wherein the positioning of the embedded media marker on the article comprises:
   a. projecting a shape of the embedded media marker in two perpendicular directions to obtain a first projection and a second projection;
   b. for each of the first projection and the second projection, generating a fixed-aspect-ratio bounding rectangle of the shape of the embedded media marker to form a plurality of bounding rectangles;
   c. determining a reference circle that can be covered by each of the plurality of bounding rectangles;
   d. generating a two-dimensional vector between a center of the reference circle and the location;
   e. determining a radius of the reference circle;
   f. using a ratio of a radius of the embedded media marker to the radius of the reference circle to scale the two dimensional vector and the embedded media marker for positioning the embedded media marker.

22. A computer-implemented method for producing an article including visualized content and an embedded media marker comprising a visible feature boundary on the content, the method comprising:
   a. receiving a user selection of a location on the visualized content of the article;
   b. determining a position and a size of the embedded media marker, including a location of the visible feature boundary, based on having at least a threshold quantity of local image features extracted from a local spatial arrangement of the visualized content near the selected location within the embedded media marker; and
   c. positioning the embedded media marker on the article based on the determined position and size, wherein the embedded media marker indicates availability of a digital media object associated with the location within the visualized content, wherein the location of the visible feature boundary is determined such that the selected portion of the content may be identified by extracting only a plurality of local image features that are within the determined location of the visible feature boundary, wherein the embedded media marker further comprises a media-type indicator comprising a media-type boundary, wherein the media-type indicator is disposed within the feature boundary, wherein the determining the position and size of the embedded media marker comprises determining at least one of a feature boundary circle center, a feature boundary circle radius, and media type circle center, wherein the determining a position and a size of the embedded media marker further comprises determining if sufficient local image features exist within the embedded media marker by estimating the number of local image features within the determined position and size of the embedded media marker, and wherein the estimating the number of local image features comprises deriving a square approximating the feature boundary circle; and determining the number of local image features within the derived square based on a cumulative keypoint distribution map of the content.

23. A non-transitory computer readable storage medium storing instructions for providing a digital medium by making use of a database and an article, the database storing a set of information corresponding to a portion of content visualized in a predetermined space, the set of information including (i) a plurality of local image features existing prior to placement of at least one embedded media marker and within the portion extracted from a local spatial arrangement of the content and (ii) an embedded digital media corresponding to the portion, the portion of content has an area which includes the plurality of local image features sufficient to identify the portion of content, the article holding the portion of content and a placement of the at least one embedded media marker on said portion of content, the embedded media marker including a visible feature boundary enclosing the portion of the content, the instructions when executed by a processor performing a method comprising:

a. receiving, from a requestor, an image of a patch comprising an image of the placed embedded media marker, including the visible feature boundary, on the article;

b. determining a location of the visible feature boundary in the image of the patch;

c. based on the determined location of the visible feature boundary, extracting only local image features that are within the determined location of the visible feature boundary, from the image of the patch, and identifying the embedded media marker from the extracted local image features by comparing the extracted local image features to the plurality of local image features existing prior to the placement of the at least one embedded media marker of the set of information;

d. identifying the embedded digital media corresponding to the embedded media marker;

e. retrieving the embedded digital media from the database; and f. providing the retrieved digital media to the requestor.

24. The non-transitory computer readable storage medium of claim 23, wherein the embedded media marker further comprises a media-type indicator which comprises a media-type icon disposed within a media-type boundary, the media-type icon representing the type of media of the embedded digital media.

25. The non-transitory computer readable storage medium of claim 23, wherein the embedded media marker is alpha-blended with the visualized content of the article.

26. A computer-implemented method for providing a digital medium, the digital medium including a document having content and an embedded media maker signifying a digital media object in association with index information based on a plurality of local image features existing prior to placement of the embedded media marker within a patch of the document extracted from a local spatial arrangement of the content;

receiving an image, from a requestor, of at least a portion of the document including an image of a placement of the embedded media marker, the embedded media marker having a visible feature boundary enclosing a portion of the document and defining the patch of the document, and a media type boundary within the feature boundary, enclosing a media icon;

determining a location of the visible feature boundary in the image of the patch;

based on the determined location of the visible feature boundary, extracting only local image features of the content that are within the determined location of the visible feature boundary;

identifying the digital media object corresponding to the embedded media marker by comparing the local image features extracted from within the visible feature boundary to the plurality of local image features existing prior to the placement of the embedded media marker of the index information stored in association with the digital media object;

retrieving the identified digital media object; and providing the retrieved digital media object to the requestor.

27. The computer-implemented method of claim 26, further comprising identifying the media icon within the embedded media marker and identifying the digital media object using the identified media icon.

* * * * *